US009162904B2

(12) United States Patent
Guastella et al.

(10) Patent No.: US 9,162,904 B2
(45) Date of Patent: Oct. 20, 2015

(54) CLEANING SOLUTION GENERATOR

(75) Inventors: Robert James Guastella, Delano, MN (US); Daniel L. Joynt, Columbus, MN (US)

(73) Assignee: Tennant Company, Minneapolis, MN (US)

( * ) Notice: Subject to any disclaimer, the term of this patent is extended or adjusted under 35 U.S.C. 154(b) by 218 days.

(21) Appl. No.: 13/410,535

(22) Filed: Mar. 2, 2012

(65) Prior Publication Data

US 2012/0228145 A1    Sep. 13, 2012

Related U.S. Application Data

(60) Provisional application No. 61/449,369, filed on Mar. 4, 2011.

(51) Int. Cl.
| | |
|---|---|
| *C02F 1/461* | (2006.01) |
| *C25B 9/00* | (2006.01) |
| *C02F 1/467* | (2006.01) |
| *C25B 1/16* | (2006.01) |
| *C02F 1/42* | (2006.01) |

(52) U.S. Cl.
CPC ............. *C02F 1/4618* (2013.01); *C02F 1/4672* (2013.01); *C25B 1/16* (2013.01); *C02F 1/42* (2013.01); *C02F 2001/4619* (2013.01); *C02F 2001/46185* (2013.01); *C02F 2201/4614* (2013.01); *C02F 2201/4618* (2013.01); *C02F 2201/46115* (2013.01); *C02F 2201/46145* (2013.01); *C25B 9/00* (2013.01)

(58) Field of Classification Search
None
See application file for complete search history.

(56) References Cited

U.S. PATENT DOCUMENTS

| | | | | |
|---|---|---|---|---|
| 3,083,728 | A | * | 4/1963 | Schulze et al. ........... 137/599.15 |
| 3,627,133 | A | * | 12/1971 | Rak ................................. 210/98 |
| 3,819,329 | A | | 6/1974 | Kaestner et al. |
| 3,872,004 | A | * | 3/1975 | Grout et al. .................... 210/127 |
| 4,169,773 | A | | 10/1979 | Lai et al. |
| 4,173,524 | A | | 11/1979 | McRae |
| 4,201,651 | A | | 5/1980 | Themy |
| 4,599,159 | A | | 7/1986 | Hilbig |
| 4,624,760 | A | | 11/1986 | Pottinger et al. |
| 4,781,810 | A | | 11/1988 | Tucker |
| 4,783,246 | A | | 11/1988 | Langeland et al. |
| 5,069,779 | A | * | 12/1991 | Brown et al. .................... 210/87 |
| 5,374,341 | A | | 12/1994 | Aoki et al. |
| 5,445,722 | A | | 8/1995 | Yamaguti et al. |
| 5,628,888 | A | | 5/1997 | Bakhir et al. |

(Continued)

FOREIGN PATENT DOCUMENTS

| | | |
|---|---|---|
| DE | 202005015370 U1 | 2/2006 |
| DE | 102006058454 A1 | 6/2008 |

(Continued)

OTHER PUBLICATIONS

Machine translation of KR1020030065030 A.*

(Continued)

*Primary Examiner* — Harry D Wilkins, III
(74) *Attorney, Agent, or Firm* — David D. Brush; Westman, Champlin & Koehler, P.A.

(57) ABSTRACT

A cleaning solution generator comprising a housing with an interior reservoir and a brine tank, the cleaning solution generator being configured to generate an alkaline solution from a mixed solution and to operably direct the generated alkaline solution to the interior reservoir of the housing.

17 Claims, 14 Drawing Sheets

(56) References Cited

U.S. PATENT DOCUMENTS

| | | | |
|---|---|---|---|
| 5,643,425 A * | 7/1997 | Amano et al. | 204/279 |
| 5,762,769 A | 6/1998 | Gotsu et al. | |
| 5,858,201 A | 1/1999 | Otsuka et al. | |
| 5,900,136 A | 5/1999 | Gotsu et al. | |
| 5,932,171 A | 8/1999 | Malchesky | |
| 5,958,229 A | 9/1999 | Filiopoulos et al. | |
| 5,997,717 A | 12/1999 | Miyashita et al. | |
| 6,059,941 A | 5/2000 | Bryson et al. | |
| 6,113,853 A | 9/2000 | Nakamura et al. | |
| 6,187,154 B1 | 2/2001 | Yamaguchi et al. | |
| 6,315,886 B1 | 11/2001 | Zappi et al. | |
| 6,337,002 B1 | 1/2002 | Kashimoto | |
| 6,632,347 B1 | 10/2003 | Buckley et al. | |
| D490,947 S | 6/2004 | Cattaneo | |
| 6,878,287 B1 | 4/2005 | Marais | |
| D519,693 S | 4/2006 | Ricker et al. | |
| 7,303,660 B2 * | 12/2007 | Buckley et al. | 204/232 |
| D560,046 S | 1/2008 | Renner et al. | |
| D567,458 S | 4/2008 | Jiang | |
| D649,308 S | 11/2011 | Alexander et al. | |
| 2001/0022273 A1 | 9/2001 | Popov et al. | |
| 2003/0098244 A1 | 5/2003 | Ruhr et al. | |
| 2003/0159231 A1 | 8/2003 | Oh | |
| 2005/0126928 A1 | 6/2005 | Hung et al. | |
| 2006/0283808 A1 | 12/2006 | Kadlec et al. | |
| 2007/0007146 A1 | 1/2007 | Childers et al. | |
| 2007/0051640 A1 | 3/2007 | Bellamy | |
| 2007/0207350 A1 | 9/2007 | Highgate | |
| 2008/0190763 A1 | 8/2008 | Del Signore | |
| 2008/0210552 A1 | 9/2008 | Del Signore | |
| 2008/0230381 A1 | 9/2008 | Krstajic et al. | |
| 2008/0264778 A1 | 10/2008 | Joshi et al. | |
| 2009/0000944 A1 | 1/2009 | Varcoe | |
| 2009/0008268 A1 | 1/2009 | Salathe et al. | |
| 2009/0071883 A1 | 3/2009 | Gomez | |
| 2009/0181107 A1 | 7/2009 | Buckley et al. | |
| 2009/0211919 A1 * | 8/2009 | Hegel et al. | 205/633 |
| 2010/0147700 A1 | 6/2010 | Field et al. | |
| 2010/0192987 A1 | 8/2010 | Steffen | |
| 2011/0176991 A1 | 7/2011 | Czech et al. | |

FOREIGN PATENT DOCUMENTS

| | | | |
|---|---|---|---|
| EP | 0636581 A1 | 2/1995 | |
| EP | 0761235 B1 | 3/1997 | |
| EP | 1007478 A1 | 6/2000 | |
| EP | 1728768 A1 | 12/2006 | |
| EP | 1878704 A1 | 1/2008 | |
| EP | 2191721 A1 | 6/2010 | |
| EP | 2239231 A1 | 10/2010 | |
| JP | 2149395 A | 6/1990 | |
| JP | 2000043724 A | 2/2000 | |
| KR | 1020030065030 A * | 8/2003 | C02F 1/461 |
| KR | 100599229 B1 | 7/2006 | |
| KR | 1020090123297 | 12/2009 | |
| WO | 9812144 A1 | 3/1998 | |
| WO | 2004084698 A2 | 10/2004 | |
| WO | 2008131389 A1 | 10/2008 | |
| WO | 2009039674 A1 | 4/2009 | |
| WO | 2009046563 A2 | 4/2009 | |
| WO | 2009115577 A1 | 9/2009 | |
| WO | 2010012792 A2 | 2/2010 | |
| WO | 2010037389 A1 | 4/2010 | |

OTHER PUBLICATIONS

Search Report dated May 14, 2012 for corresponding International Application No. PCT/US2012/027395, filed Mar. 2, 2012.

International Search Report and Written Opinion dated Oct. 3, 2012 for corresponding International Application No. PCT/US2012/027395, filed Mar. 2, 2012.

* cited by examiner

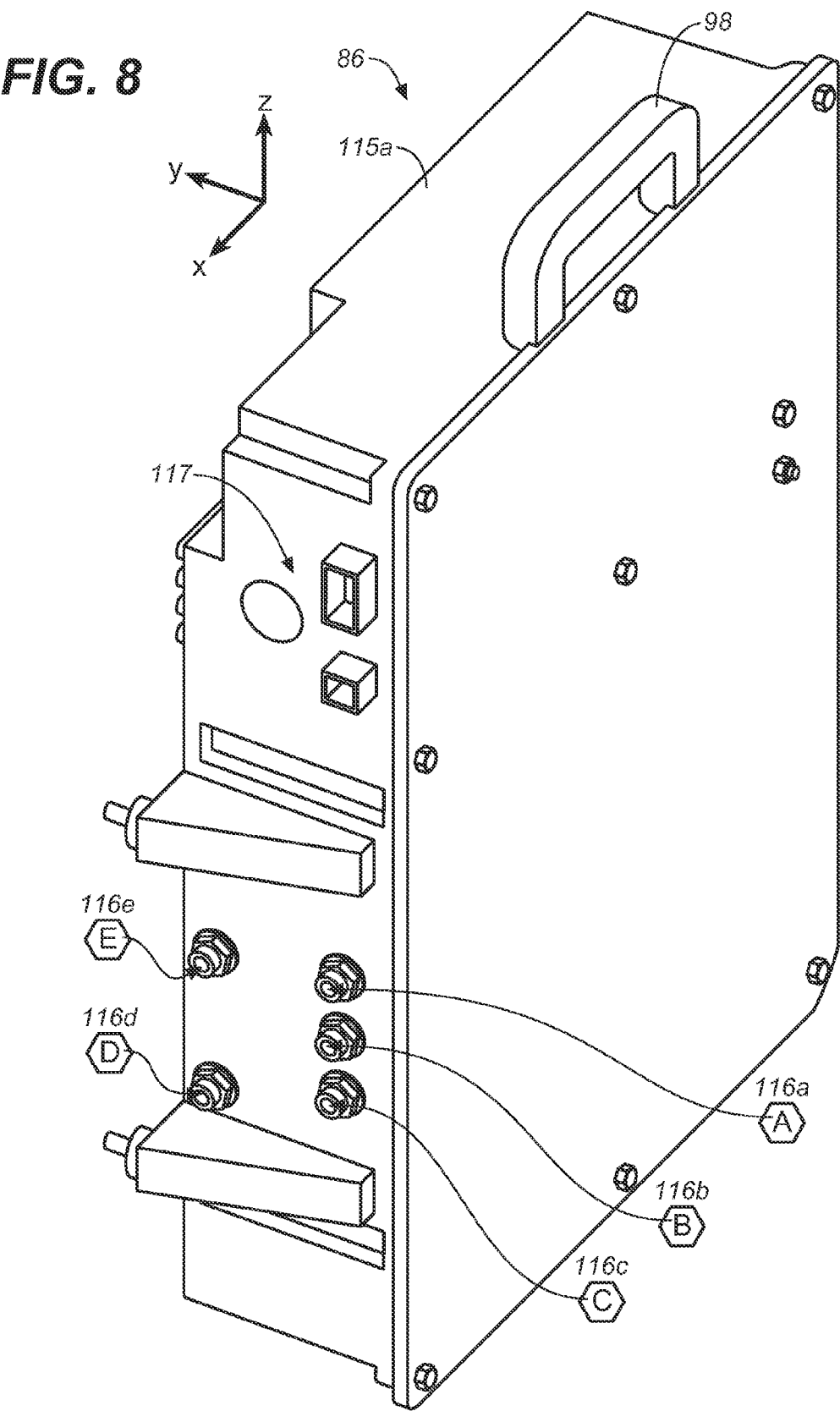

CLEANING SOLUTION GENERATOR

CROSS-REFERENCE TO RELATED APPLICATION(S)

This application claims priority to U.S. Provisional Patent Application No. 61/449,369, filed on Mar. 4, 2011, and entitled "CLEANING SOLUTION GENERATOR", the disclosure of which is incorporated by reference in its entirety.

BACKGROUND

The present disclosure relates cleaning systems, for example, and in particular, to cleaning systems for generating alkaline cleaning solutions with electrolysis reactions.

Electrolysis cells are used in a variety of different applications for changing one or more characteristics of a fluid. For example, electrolysis cells have been used in cleaning/sanitizing applications, medical industries, and semiconductor manufacturing processes. Electrolysis cells have also been used in a variety of other applications and have had different configurations. For cleaning/sanitizing applications, electrolysis cells are used to create anolyte liquids and catholyte liquid. Anolyte liquids have known sanitizing properties, and catholyte liquids have known cleaning properties.

SUMMARY

An aspect of the present disclosure is directed to a cleaning solution generator. The cleaning solution generator includes a housing having an interior reservoir, and a brine tank integrally fabricated with the housing, where the brine tank is configured to supply a brine solution. The cleaning solution generator also includes a water inlet line configured to receive water, and a manifold configured to receive and mix the water and the brine solution to produce a mixed solution. The cleaning solution generator further includes an electrolysis cell configured to receive the mixed solution and to generate an alkaline solution from at least a portion of the mixed solution, and a fluid conduit assembly configured to operably direct the generated alkaline solution to the interior reservoir of the housing.

Another aspect of the present disclosure is directed to a cleaning solution generator that includes a brine tank configured to supply a brine solution, a water line configured to receive water, an injection pump configured to draw the brine solution from the brine tank, and a manifold configured to receive the water from the water line and the brine solution from the injection pump to produce a mixed solution. The cleaning solution generator also includes an electrolysis cell configured to receive the mixed solution and to generate an alkaline solution from at least a portion of the mixed solution, and a current sensor configured to measure an electrical current induced across the electrolysis cell. The cleaning solution generator further includes a control system configured to adjust a pump rate of the injection pump in response to the measured currents from the current sensor, and further configured to compare the pump rate of the injection pump to at least one pump rate threshold.

Another aspect of the present disclosure is directed to a method for generating an alkaline solution. The method includes injecting a brine solution to a water stream to produce a mixed stream, introducing the mixed stream to an electrolysis cell, and applying a voltage to the electrolysis cell to induce an electrical current across the electrolysis cell. The method also includes measuring the electrical current induced across the electrolysis cell, and adjusting a rate of injecting the brine solution to the water stream based on the measured electrical current to attain a predetermined set point. The method further includes monitoring the rate of injecting the brine solution, and comparing the monitored rate to at least one threshold.

BRIEF DESCRIPTION OF THE DRAWINGS

FIG. 8 is a rear perspective view of an electrolytic module of the cleaning solution generator.

DETAILED DESCRIPTION

Figure 1:
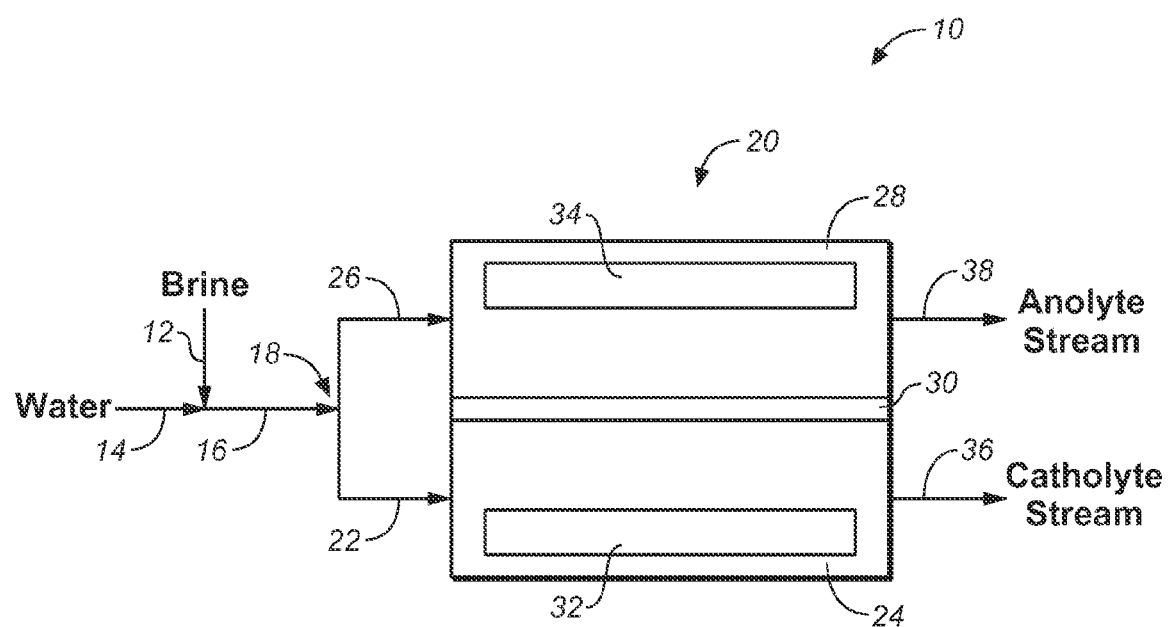
FIG. 1 is a schematic illustration of a cleaning solution generator, illustrating a process for generating an alkaline catholyte cleaning solution.

The present disclosure is directed to a cleaning solution generator that electrically restructures water and salt (e.g., sodium chloride, NaCl) to generate an alkaline cleaning solution containing sodium hydroxide (NaOH), for example. As shown in FIG. 1, which is a schematic illustration of cleaning solution generator 10, generator 10 may controllably inject a brine solution (e.g., saturated salt water) from line 12 into a water stream from line 14 to attain a mixed stream in line 16 having a predetermined salt concentration. The mixed stream in line 16 is then split into separate streams at splitter 18 prior to (or after) entering electrolysis cell 20. In particular, a first portion of the mixed stream may flow through line 22 from splitter 18, and is directed into cathode chamber 24 of electrolysis cell 20. Correspondingly, a second portion of the mixed stream in line 26 from splitter 18 is directed into anode chamber 28 of electrolysis cell 20.

Electrolysis cell 20 also includes barrier 30, cathode electrode 32, and anode electrode 34, where barrier 30 includes a membrane or other diaphragm that separates cathode chamber 24 and anode chamber 26. Cathode electrode 32 includes one or more electrodes located in cathode chamber 24 and is connected to a power source (not shown). Anode electrode 34 includes one or more electrodes located in anode chamber 28 and may also be connected to the power source.

During operation, the power source may apply a voltage to cathode electrode 32 and anode electrode 34, inducing an electrical current across electrolysis cell 20 to generate a catholyte stream containing an alkaline water with sodium hydroxide (i.e., caustic soda) from the mixed stream flowing through cathode chamber 24. This reaction also generates an anolyte stream containing chlorine acidic water from the mixed stream flowing through anode chamber 28. The resulting alkaline catholyte stream exits cathode chamber 28 through output line 36, and the acidic anolyte stream exits anode chamber 24 through output line 38.

In one embodiment, generator 10 is configured to dispense the catholyte stream from output line 36 as an alkaline cleaning solution containing sodium hydroxide. The cleaning solution is suitable for use in a variety of industrial, commercial, and residential applications since it leaves little or no residue and is non-toxic. In this embodiment, the acidic anolyte stream from output line 38 may be retained in storage vessel for subsequent use, or may be discarded in an environmentally-friendly manner.

In one aspect of the present disclosure, generator 10 includes a housing that supports the components of generator 10, where the housing itself may also function as a reservoir for storing the generated alkaline solution. Additionally, the housing may include a brine tank, which is a pocket shaped from the same mold or cast as the housing. The brine tank is configured to receive a supply of salt (e.g., sodium chloride salt pellets), and to function as a brine solution tank for the brine solution that is injected through line 12.

In another aspect of the present disclosure, generator 10 includes a control system that monitors the electrical current induced across electrolysis cell 20. In particular, the control system may, for example, measure fluctuations in the electrical current induced across electrolysis cell 20 with a current sensor. Based on the measured electrical currents, the control system may adjust the injection rate of the brine solution through line 12. This ensures that the mixed stream flowing to electrolysis cell 20 has a consistent and controlled salt concentration, allowing electrolysis cell 20 to generate a high-quality alkaline solution in cathode chamber 24 with controlled compositional properties.

The control system may also identify when the salt level in the integrated brine tank is low based on the measured electrical currents and the injection rates (e.g., pump or step rates) of the brine solution through line 12. As discussed below, the control system may then inform a user that generator 10 is low on salt, allowing the user to refill the brine tank with additional amounts of salt. This further ensures that the mixed stream flowing to electrolysis cell 20 has a consistent and controlled salt concentration, and also protects the components of generator 10 (e.g., electrolysis cell 20) from being exposed to hard water.

Figure 2:
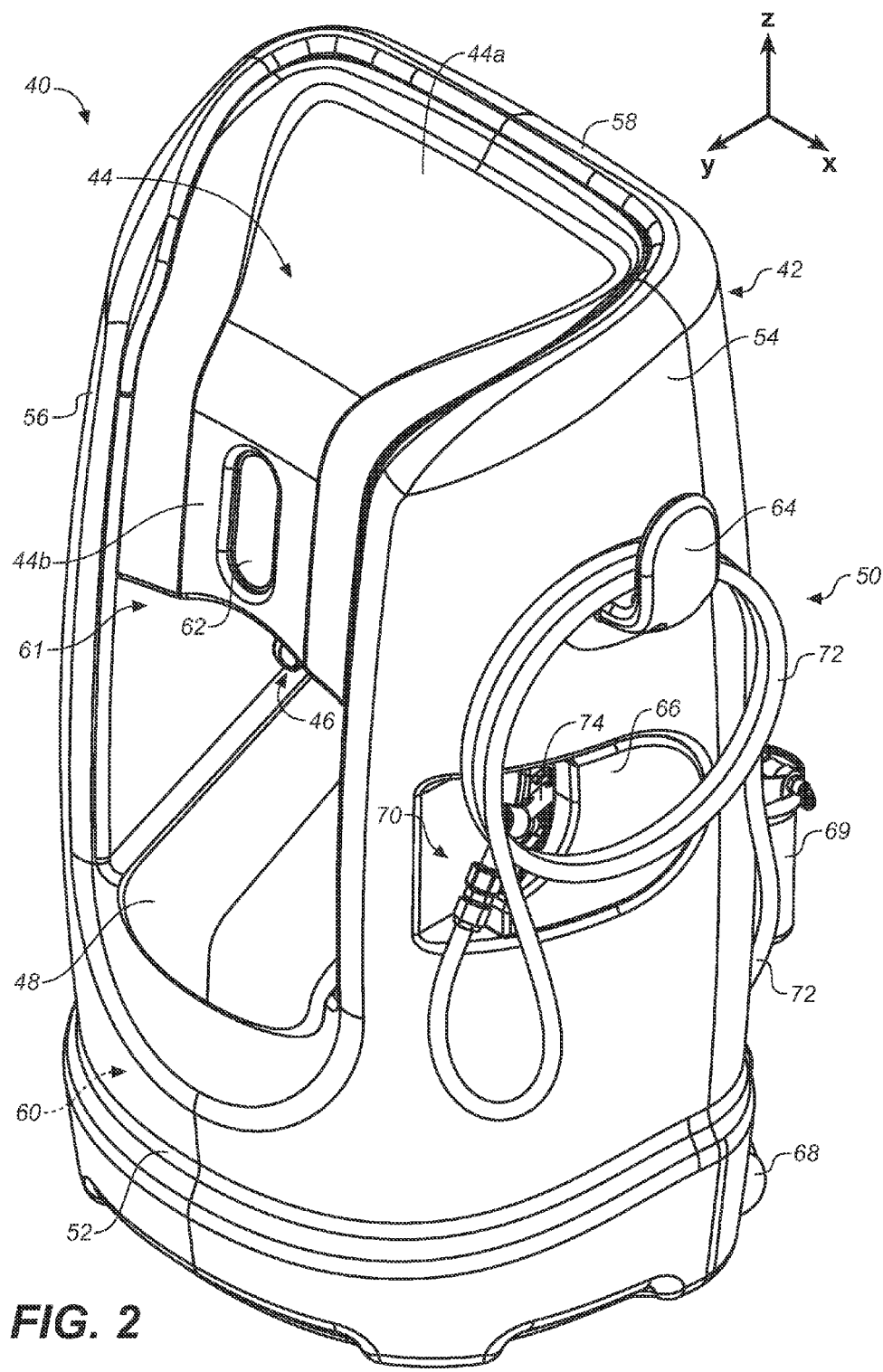
FIG. 2 is a front perspective view of a cleaning solution generator of the present disclosure.

FIG. 2 illustrates generator 40, which is an example of a suitable cleaning solution generator of the present disclosure, and which may operate in the same manner as generator 10 (shown in FIG. 1). As shown in FIG. 2, generator 40 includes housing 42, display cover 44, small vessel fill assembly 46, and brine tank cover 48, and dispenser assembly 50. Housing 42 is a hollow structural component of generator 40, and, in the shown embodiment, also functions as a reservoir for retaining a generated alkaline solution.

Housing 42 includes base portion 52, which extends upward into lateral portions 54 and 56, and into rear portion 58, where rear portion 58 offsets lateral portions 54 and 56 at the rear side of housing 42. Base portion 52, lateral portions 54 and 56, and rear portion 58 are integrally molded or cast as a single article from one or more plastic and/or metallic materials, and provide an overall rigid structure for retaining the various components of generator 40. Furthermore, base portion 52, lateral portions 54 and 56, and rear portion 58 are each desirably hollow, at least in part, to provide an interior reservoir for retaining the generated alkaline solution (referred to as interior reservoir 60, illustrated with a hidden line, and further shown below in FIGS. 7A and 7B). Suitable capacities for interior reservoir 60 range from about 400 liters to about 500 liters.

The arrangement of base portion 52, lateral portions 54 and 56, and rear portion 58 defines front opening 61 in housing 42, which provides a suitable location for retaining display cover 44, small vessel fill assembly 46, and brine tank cover 48. Display cover 44 is a cover member of generator 40 that may be fabricated from one or more plastic and/or polymeric materials, and is configured to be removably secured to housing 42 at front opening 61, at the top portion of housing 42. Display cover 44 includes top surface 44a and front surface 44b, which are integrally formed together and bend to follow the geometry of housing 42 at front opening 61. Display cover 44 protects fluid tanks, fluid conduits, and electronic components of generator 40, and provides a suitable location for retaining display panel 62.

Display panel 62 includes an electronic user interface mounted to front surface 44b that allows a user to operate generator 40. As discussed below, display panel 62 simplifies the operation of generator 40 with intuitive controls and indicators.

Small vessel fill assembly 46 is a first dispensing unit of generator 40, and provides a convenient mechanism to dispense small flows of the alkaline solution from generator 40, such as into small vessels and containers. Suitable dispensing rates for small vessel fill assembly 46 range from about 1 liter/minute to about 3 liters/minute, for example.

Brine tank cover 48 is a cover member configured to provide access to a brine tank of generator 40 (not shown in FIG. 2), where the brine tank may be integrally formed in base portion 52 of housing 42, as discussed below. Brine tank cover 48 may also be fabricated from one or more plastic and/or polymeric materials, and may be mountable to housing 42 in a manner that allows a user to readily access the brine tank to add salt. For example, brine tank cover 48 may rest on base portion 52 and/or may include a hinged connection to base portion 52.

Dispenser assembly 50 is a second dispensing unit of generator 40, and is configured to dispense greater flows of the alkaline solution from generator 40 compared to small vessel fill assembly 46. Suitable dispensing rates for dispenser assembly 50 range from about 30 liters/minute to about 60 liters/minute, for example. Thus, dispenser assembly 50 may dispense the alkaline solution into a variety of different vessels, such as larger containers, buckets, and machines (e.g., commercial floor cleaning systems).

As further shown, generator 40 also includes hook 64, nozzle dock 66, pump 68, and input filter assembly 69, where hook 64 is secured to lateral portion 54 of housing 42. Nozzle dock 66 is a component secured at dock indentation 70 in lateral portion 54. Pump 68 is a liquid pump located at the rear side of housing 42, and is configured to pump the generated alkaline solution to dispenser assembly 50. Input filter assembly 69 is a filter assembly mounted to housing 42 at the rear side of generator 40, and is configured to filter water that is introduced into generator 40 from an external source (e.g., a water faucet, not shown).

Dispenser assembly 50 includes hose 72 and dispensing nozzle 74, where a first end of hose 72 is coupled to pump 68 and a second end of hose 72 is coupled to dispensing nozzle 74. As shown, hose 72 may be wrapped around hook 64 for convenient storage and access. Dispensing nozzle 74 is a hand-activated nozzle (e.g., similar to a gas pump nozzle) that a user may hold and activate (e.g., with a trigger or lever) to dispense the alkaline solution from generator 40. When not in use, the user may insert dispensing nozzle 74 into nozzle dock 66 for convenient storage and access.

In one embodiment, nozzle dock 66 includes a sensor (e.g., a magnetic and/or contact switch, not shown) configured to detect the presence of dispensing nozzle 74 when dispensing nozzle 74 is inserted and retained in nozzle dock 66. The sensor is desirably connected to the control system of generator 40 (not shown in FIG. 2), where the control system controls the operation of generator 40. As such, when the sensor in nozzle dock 66 detects that a user has removed dispensing nozzle 74 from nozzle dock 66, the control system may direct pump 68 to begin pumping the alkaline solution from interior reservoir 60 to dispenser assembly 50. This produces a pressurized flow of the alkaline solution, which is ready for dispensing when the user operates dispensing nozzle 74.

When the user then returns dispensing nozzle 74 to nozzle dock 66, the sensor in nozzle dock 66 detects the presence of dispensing nozzle 74 in nozzle dock 66. As such, the control system may then direct pump 68 to stop pumping, to prevent pressure build ups within dispenser assembly 50.

Figure 3:
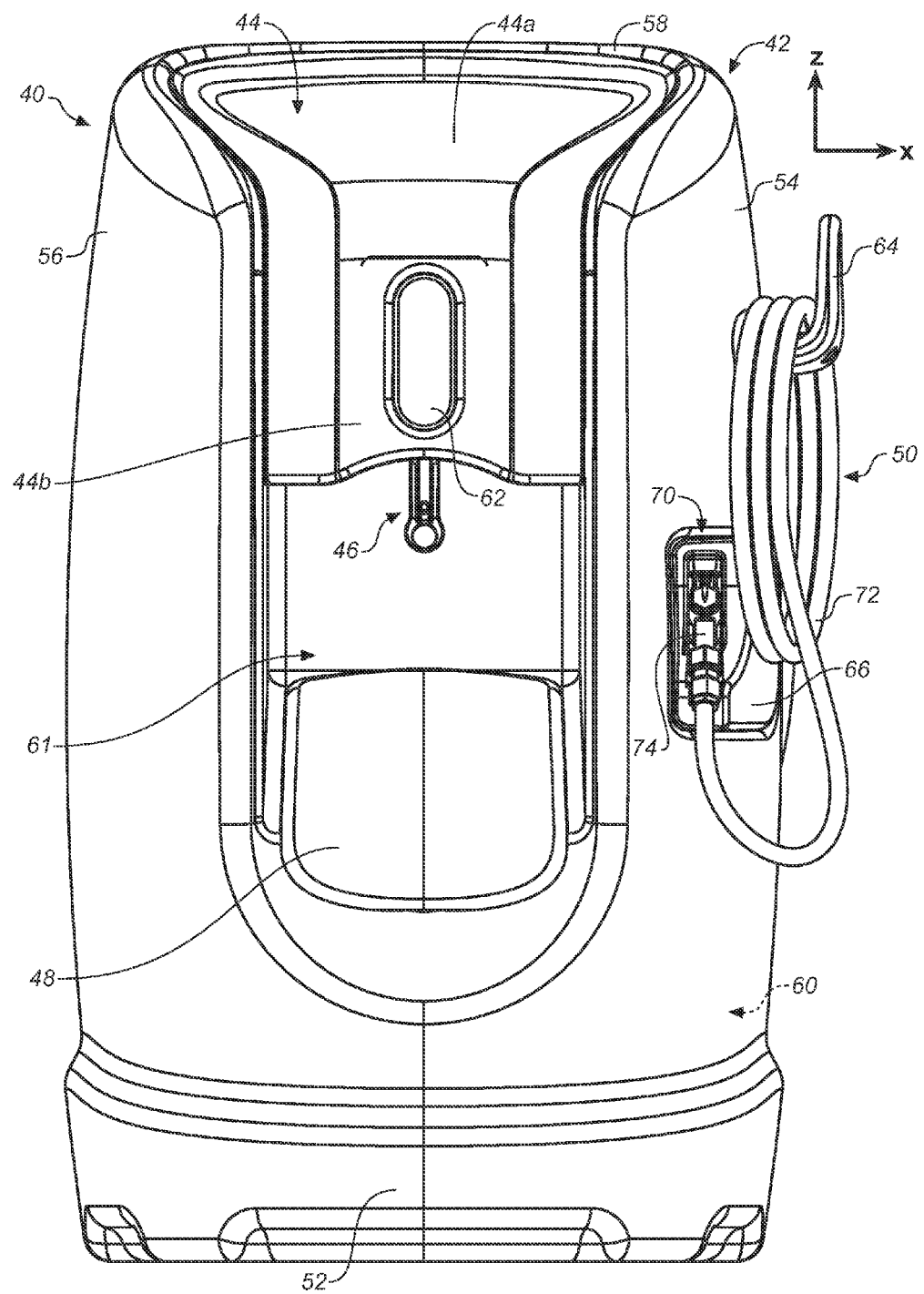
FIG. 3 is a front view of the cleaning solution generator.

As shown in FIG. 3, dispenser assembly 50 is mounted at lateral member 54 of housing 42 (i.e., the right-side lateral member). In an alternative embodiment, dispenser assembly 50 may be mounted at lateral member 56 of housing 42 (i.e., the left-side lateral member). In a further alternative embodiment, generator 40 may be configured to dispense the acidic anolyte solution in addition to the alkaline solution. In this embodiment, generator 40 may include an additional dispenser assembly (not shown) corresponding to dispenser assembly 50, but mounted at lateral member 56. In this embodiment, interior reservoir 60 of housing 42 may be divided into two separate chambers, one for the acidic anolyte solution and one for the alkaline solution. Additionally, in this embodiment, generator 40 may also include an additional bottle fill assembly (not shown) corresponding to small vessel fill assembly 46, or small vessel fill assembly 46 may be selectively switched to dispense either the alkaline solution or the acidic anolyte solution.

Figure 4:
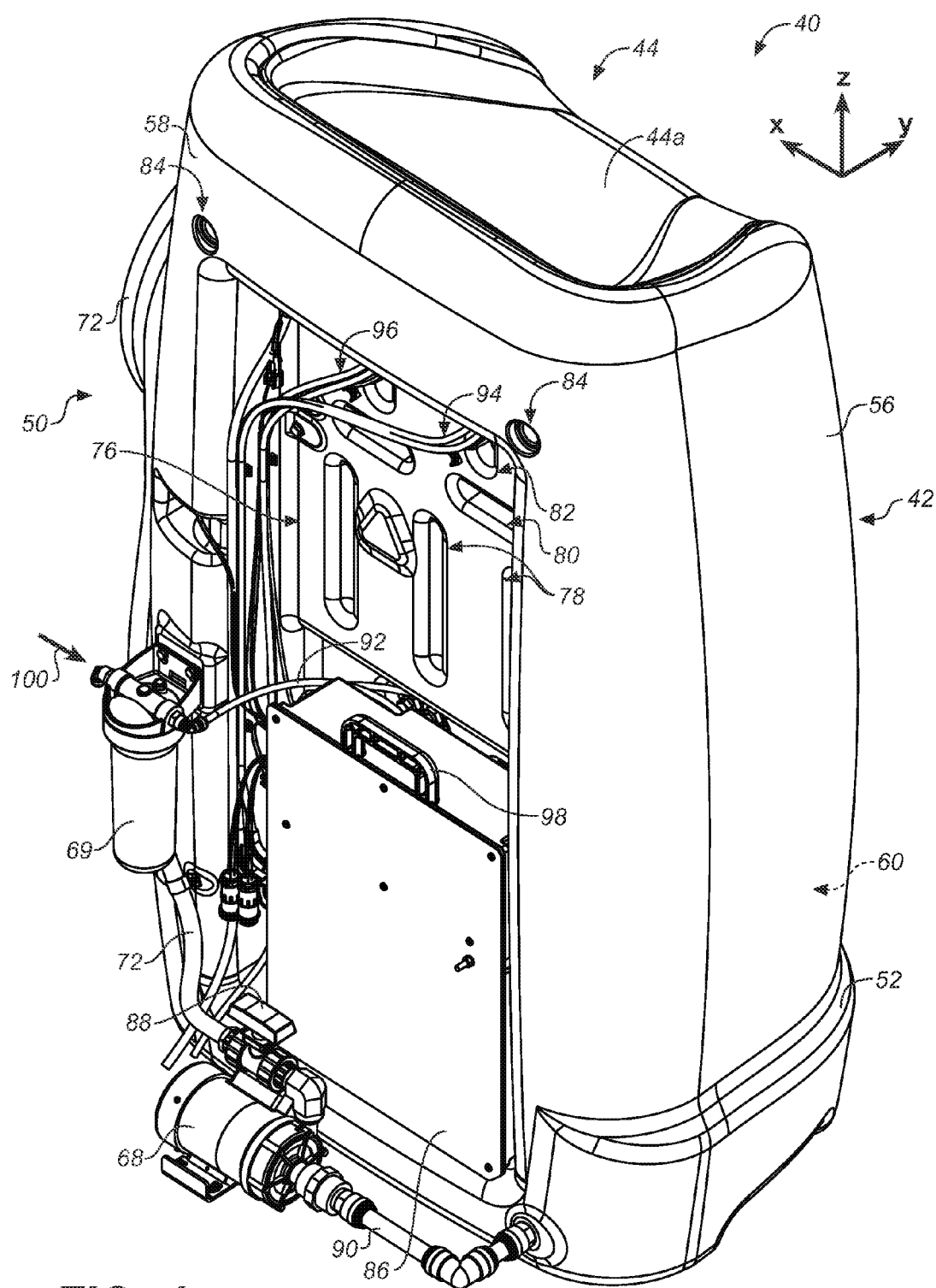
FIG. 4 is a rear perspective view of the cleaning solution generator.
Figure 5:
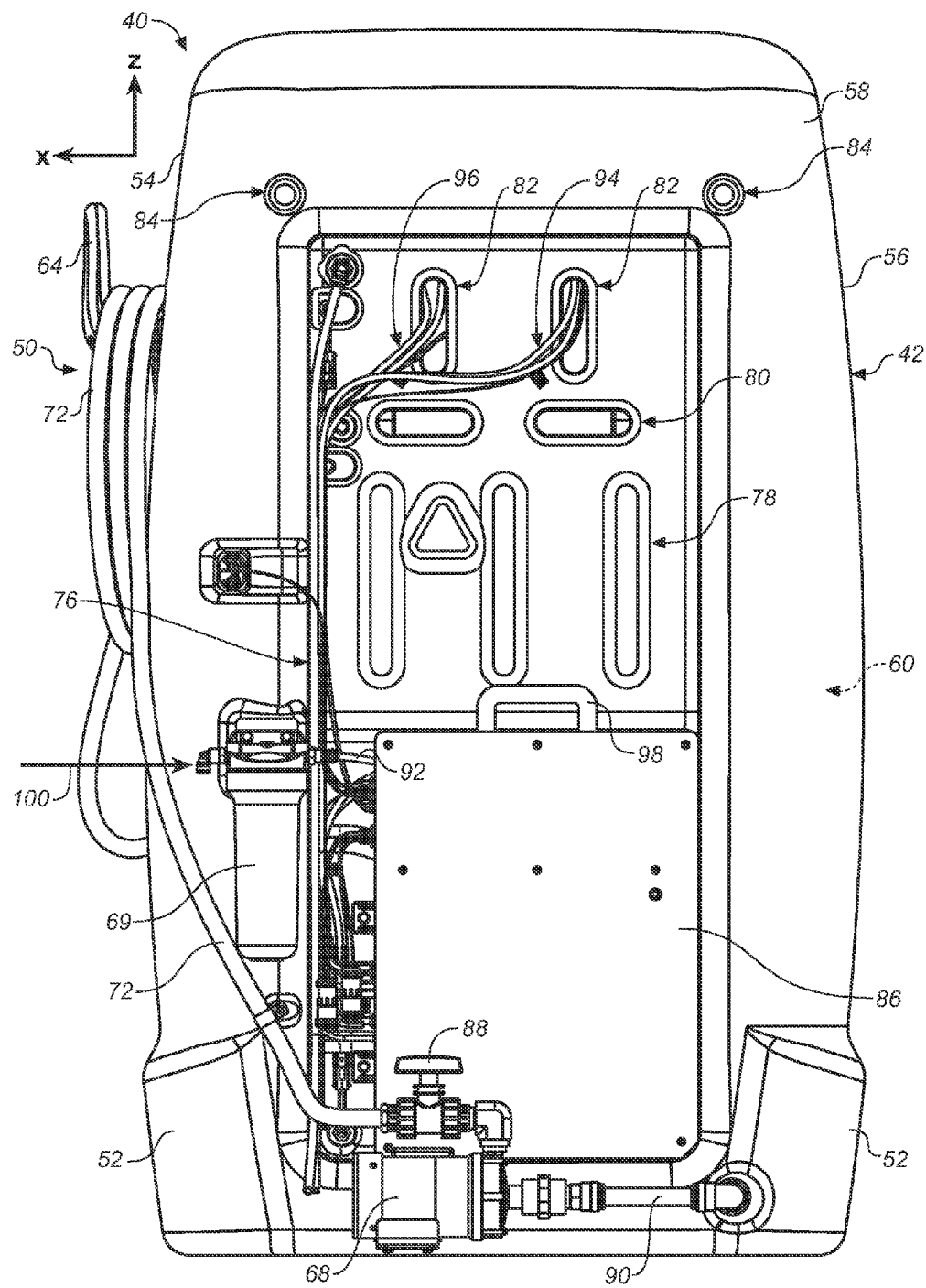
FIG. 5 is a rear view of the cleaning solution generator.

As shown in FIGS. 4 and 5, rear portion 58 of housing 42 includes recessed section 76, which extends substantially along the height of rear portion 58. Recessed section 76 includes rib members 78, horizontal slots 80, and vertical slots 82 (best shown in FIG. 5). Rib members 78 are vertical indentations in recessed section 76 to increase the structural support of housing 42. Horizontal slots 80 and vertical slots 82 are sets of openings through recessed section 76 that provide access pathways through housing 42 between recessed section 76 and front opening 61, behind display cover 44.

Rear portion 58 also includes vent ports 84, which are openings to interior reservoir 60 of housing 42. Vent ports 84 allow pressures within interior reservoir 60 to equalize with external, atmospheric pressures when introducing the generated catholyte solution into interior reservoir 60 or when pumping the catholyte solution from interior reservoir 60 with pump 68. As discussed above, base portion 52, lateral portions 54 and 56, and rear portion 58 are integrally molded or cast as a single article. As such, vent ports 84 are suitable for balancing the pressure within housing 42.

Generator 40 also includes electrolytic module 86, dispensing control valve 88, coupling conduit 90, water line 92, catholyte lines 94, and anolyte lines 96. Electrolytic module 86 is a module that is removably secured to the bottom half of housing 42 at recessed section 76. Electrolytic module 86 includes an electrolysis cell corresponding to electrolysis cell 20 (shown in FIG. 1) for generating the alkaline solution. In some embodiments, electrolytic module 86 may also include one or more control boards for controlling the various components of electrolytic module 86 and/or generator 40.

Electrolytic module 86 includes handle 98 for ease of handling and transportation. Accordingly, electrolytic module 86 may be installed to generator 40 for use in generating alkaline solutions (and acidic anolyte solutions). However, electrolytic module 86 may also be readily removed from generator 40, such as for maintenance, replacement, or cleaning. For example, if the electrolysis cell of electrolytic module 86 requires maintenance, a technician can readily remove electrolytic module 86 and replace it with a new electrolytic module 86.

Dispensing control valve 88 interconnects pump 68 and hose 72, and provides a mechanism for physically blocking the flow of the alkaline solution from interior reservoir 60 to dispenser assembly 50. Coupling conduit 90 is a fluid line that connects pump 68 to interior reservoir 60 for directing the alkaline solution to pump 68. In particular, coupling conduit 90 has a first end extending into housing 42 at base portion 52, and a second end coupled to pump 68.

Water line 92 is a fluid conduit that connects input filter 69 to interior components of generator 40 for directing a supply of water from the external source (not shown) to a water softener (not shown in FIGS. 4 or 5) located in the brine tank (not shown in FIGS. 4 or 5). This allows water from the external source to be introduced into generator 40, as indicated by arrow 100. The water entering input filter 69 desirably has a suitable pressure to maintain a suitable flow rate through generator 40. Suitable inlet pressures for the water entering generator 40 range from about 2 bars (about 30 pounds/square inch (psi)) to about 7 bars (about 100 psi), for example.

Catholyte lines 94 and anolyte lines 96 are fluid conduits that extend through vertical slots 82 in recessed section 76. Catholyte lines 94 and anolyte lines 96 respectively transfer the alkaline catholyte solution and the acidic anolyte solution from electrolytic module 86 to upper holding tanks (not shown in FIGS. 4 or 5) located at front opening 61 behind display cover 44, as discussed below.

Figure 6:
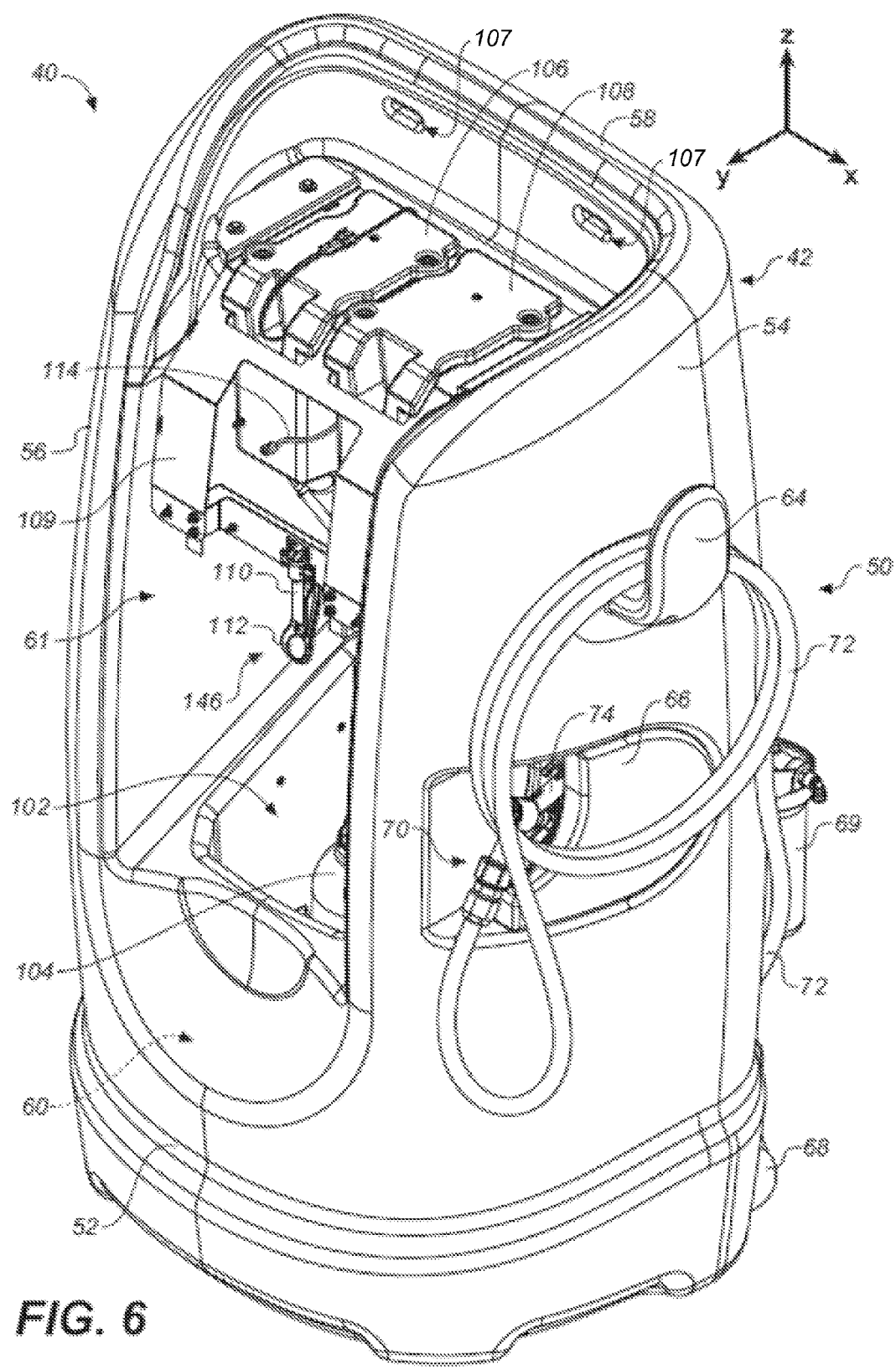
FIG. 6 is a front perspective view of the cleaning solution generator, where a panel cover and a brine tank cover are removed.
Figure 7:
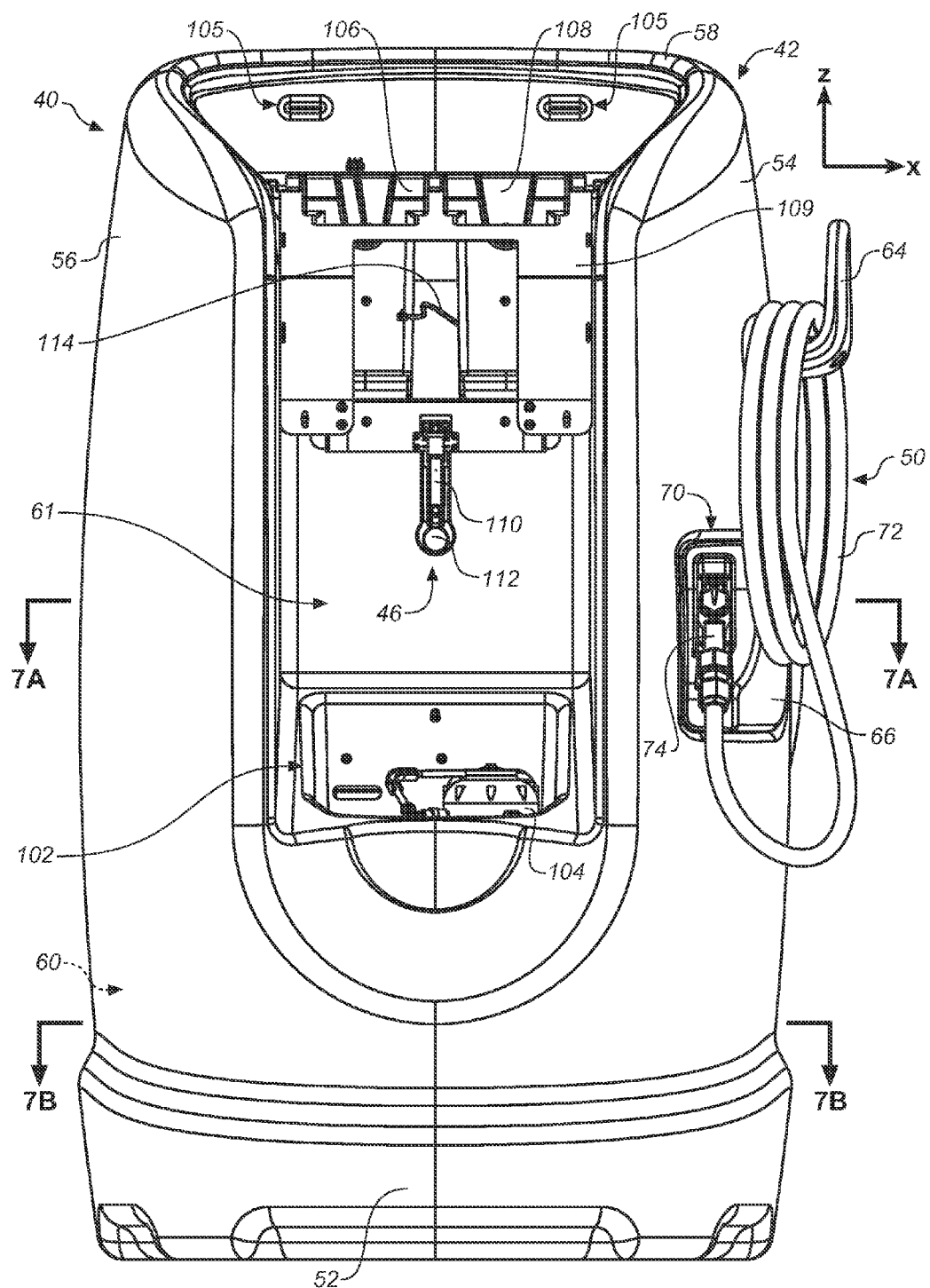
FIG. 7 is a front view of the cleaning solution generator, where the panel cover and the brine tank cover are removed.

FIGS. 6 and 7 illustrate generator 40 with display cover 44 and brine tank cover 48 removed. As shown, base portion 52 of housing 42 includes brine tank 102, where brine tank 102 is a pocket integrally formed (e.g., cast or molded) with housing 42. Brine tank 102 provides a convenient location for a user add salt (e.g., salt pellets) to generator 40 to form the brine solution. Suitable salt capacities for brine tank 102 range from about 10 kilograms of salt to about 20 kilograms of salt, for example.

Additionally, generator 40 includes water softener 104 disposed in brine tank 102. Water softener 104 is configured to receive the water from water line 92 (shown in FIGS. 4 and 5) and to soften the water with a core resin prior to relaying the water to electrolytic module 86 (shown in FIGS. 4 and 5). A portion of the water introduced to water softener 104 may also be introduced into brine tank 102 to form the brine solution, which is a saturated solution of sodium chloride in water, for example. The amount of water introduced from water softener 104 into brine tank 102 may be regulated with a flow control or flow restriction mechanism to prevent the water from overflowing brine tank 102.

As discussed below, the softened water that exits water softener 104 may then flow to electrolytic module 86. The brine solution in brine tank 102 may be drawn to electrolytic module 86, where it may be injected into the softened water in controlled amounts to regulate the amount of salt in the resulting mixed stream. As discussed below, the brine solution in brine tank 102 may also be used to regenerate the core resin in water softener 104. Thus, the brine solution may fulfill two functions in generator 40; functioning as an injected brine solution for the electrolysis process, and as a regeneration mechanism for water softener 104. As such, brine tank 102 and water softener 104 effectively function as a combined water softener/brine injection system. This prevents redundancy in requiring two separate systems for softening the supply water and injecting the brine solution. Moreover, having brine tank 102 as an integrated pocket in housing 42 further reduces redundancy in generator 40 by reducing the number of separate tanks that are otherwise required to perform these functions.

Behind display cover 44 (shown in FIGS. 2 and 3), housing 42 includes slots 107, which are indentations in housing 42 for engaging display cover 44. Generator 40 also includes holding tanks 106 and 108, which are suspended from housing 42 with the use of support frame 109. Holding tank 106 receives the alkaline solution from a first of catholyte lines 94 (shown in FIGS. 4 and 5), and is configured to retain a portion of the received catholyte solution for small vessel fill assembly 46. As discussed below, excess amounts of the alkaline solution pour out of holding tank 106, through a second of catholyte lines 94, and into interior reservoir 60 of housing 42. As shown, housing 42 provides a substantially greater storage volume in interior reservoir 60 compared to holding tank 106. This is due in part to the relative flow rates of the alkaline solution that are dispensed from dispenser assembly 50 and small vessel fill assembly 46, respectively. Suitable capacities for holding tank 106 range from about 5 liters to about 10 liters, for example.

Small vessel fill assembly 46 includes dispenser 110 and lever 112, where dispenser 110 is opened 112 when lever 112 is actuated (e.g., in a manner similar to a soft drink dispenser). This allows a user to fill small vessels, such as bottles and small containers with the alkaline solution. For example, a user may fill a hand-held spray bottle with the alkaline solution for subsequent use as a cleaning solution from the hand-held spray bottle. Holding tank 106 may direct the alkaline solution to small vessel fill assembly 46 under gravity due to the higher elevation of holding tank 106 compared to dispenser 110.

Holding tank 108 receives the acidic anolyte solution from a first of anolyte lines 96 (shown in FIGS. 4 and 5), and is configured to retain a portion of the received acidic anolyte solution for the purpose of balancing pressures within the electrolysis cell of electrolytic module 86. Misbalances in pressures within the electrolysis cell may potentially damage the barrier (e.g., diaphragm or membrane) within the electrolysis cell. As such, matching the liquid levels within holding tanks 106 and 108 allows the pressures on the opposing sides of the electrolysis cell membrane to be substantially the same, thereby extending the operational life of the electrolysis cell. As such, holding tank 108 desirably has the same capacity as holding tank 106 (e.g., from about 5 liters to about 10 liters), and is desirably mounted at the same elevation (along the vertical z-axis).

Excess amounts of the acidic anolyte solution may then pour out of holding tank 108, through a second of anolyte lines 96, and be collected for subsequent use or discarded in an environmentally-friendly manner. In one embodiment, the acidic anolyte solution produced by generator 40 is already an environmentally-friendly solution due to its low concentration of chlorine acids.

As further shown in FIGS. 5 and 6, generator 40 includes electrical cable 114. Electrical cable 114 interconnects the control system of generator 40 with display panel 62 (shown in FIGS. 2 and 3) when display cover 44 is installed on housing 42. Display panel 62 provides a convenient user interface that simplifies the operation of generator 40 with intuitive controls and indicators.

Figure 7A:
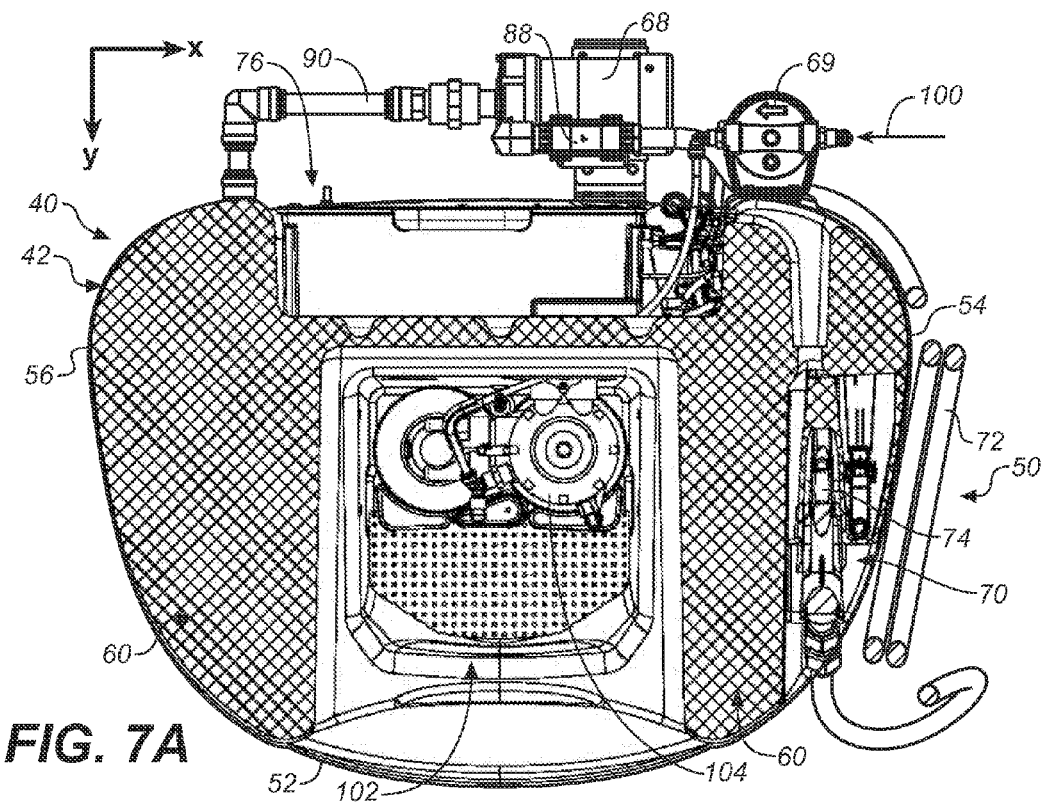
FIG. 7A is a sectional view of section 7A-7A taken in FIG. 7.
Figure 7B:
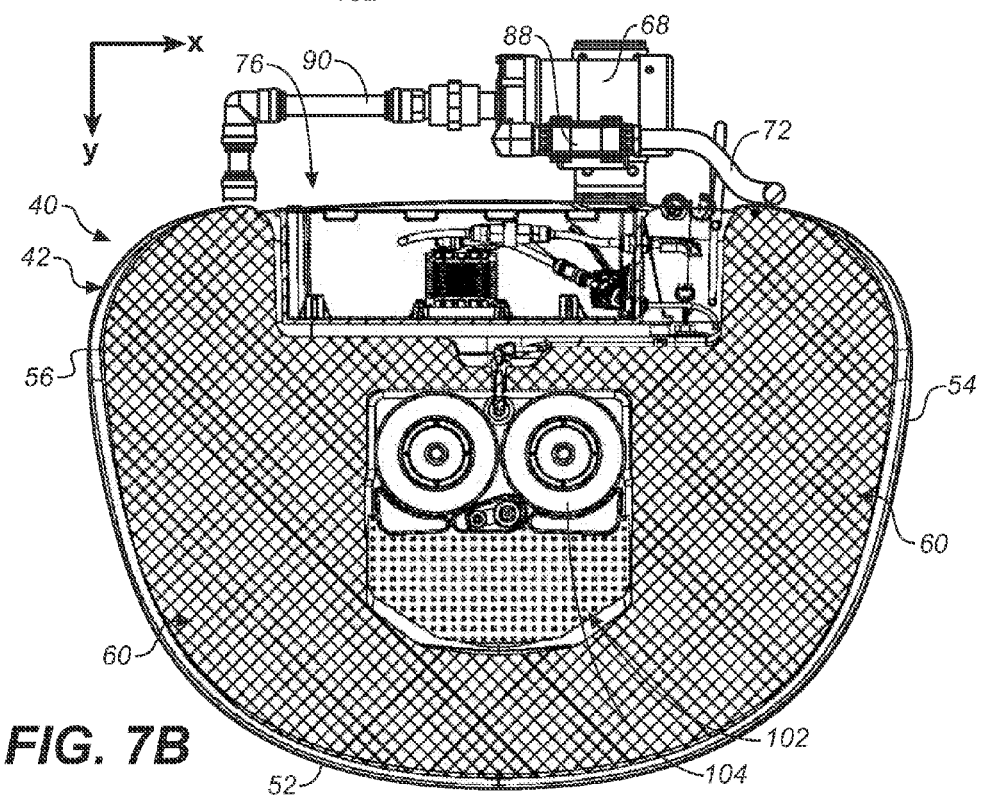
FIG. 7B is a sectional view of section 7B-7B taken in FIG. 7.

FIGS. 7A and 7B further illustrate interior reservoir 60 for receiving and storing the generated alkaline solution, where the volume of interior reservoir 60 is shown with cross-hatching for ease of visible distinction relative to the other components of generator 40. As shown, housing 42 (and brine tank 102) may be molded or cast as a single article, where interior reservoir 60 is disposed within the walls of housing 42 at base portion 52, lateral portions 54 and 56, and rear portion 58. In alternative embodiments, interior reservoir 60 may only extend through a portion of one or more of base portion 52, lateral portions 54 and 56, and rear portion 58 to vary the storage capacity of housing 42, as desired.

FIG. 8 illustrates a suitable example of electrolytic module 86. As shown, electrolytic module 86 includes front housing member 115a and rear housing member 115b, which are rigid housing members that may be secured together to retain and protect the internal components of electrolytic module 86. In the shown embodiment, front housing member 115a faces housing 42 when electrolytic module 86 is installed to generator 40, and rear housing member 115b is the portion of electrolytic module 86 that is visible in FIGS. 4 and 5.

Electrolytic module 86 also includes multiple fluid coupling ports, labeled as ports 116a-116e for directing liquid flows to and from electrolytic module 86. In the shown embodiment, port 116b may be capped. As discussed below, in an alternative embodiment, port 116b may be used as a bypass line to split a stream of the softened water, allowing the split water stream to dilute the generated alkaline solution in holding tank 106 (shown in FIGS. 6 and 7). As further shown in FIG. 8, electrolytic module 86 also includes electrical connections 117 for relaying information and/or electrical power between generator 40, electrolytic module 86, and/or display panel 62.

Figure 9:
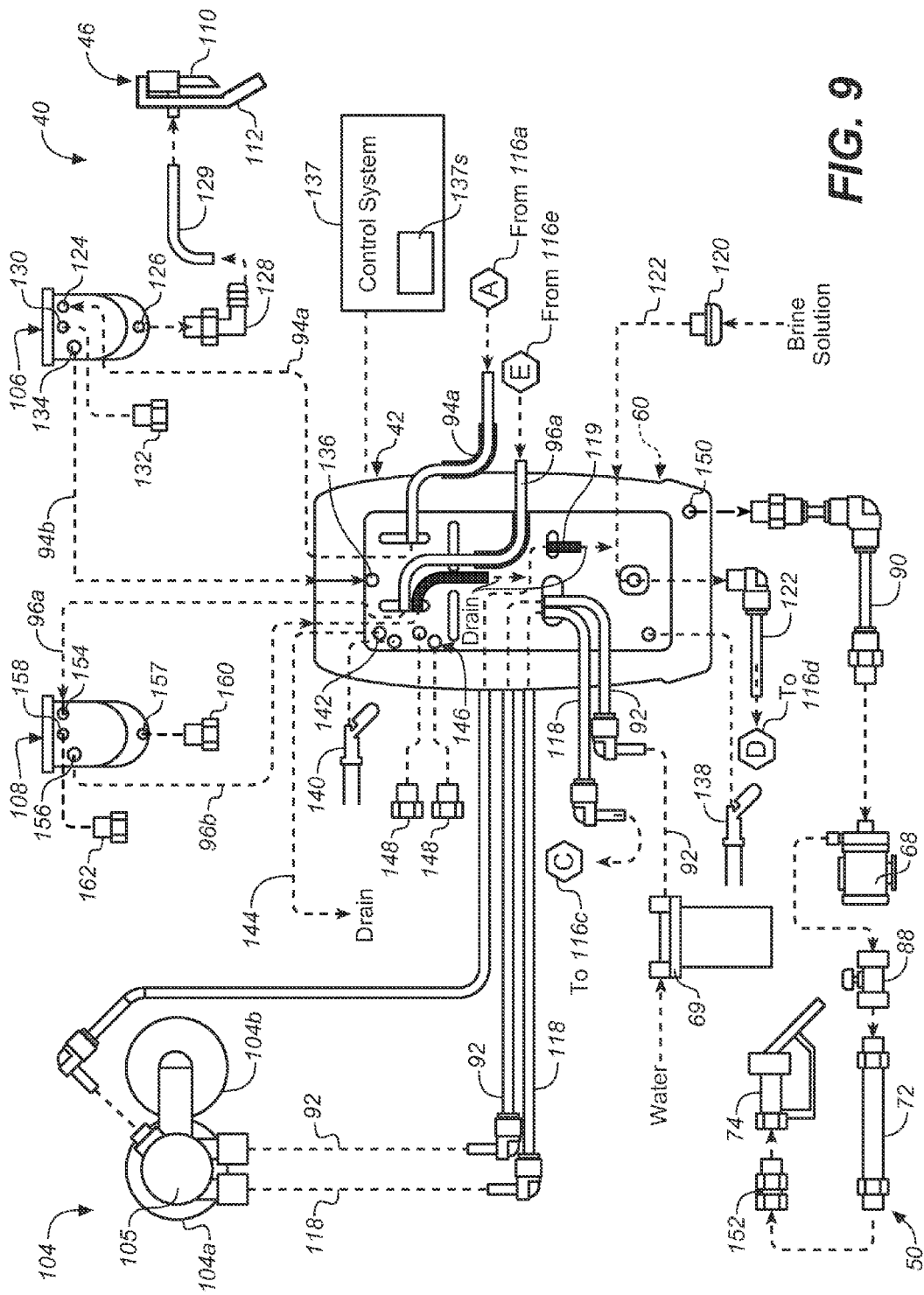
FIG. 9 is a schematic diagram of the cleaning solution generator.

FIG. 9 is a schematic diagram of the various components of generator 40, illustrating the flow paths of the liquids. During operation, water that is introduced to generator 40 may pass through input filter 69 and water line 92. As shown, water line 92 extends through an opening in housing 42 and is coupled to water softener 104, located in brine tank 102 (shown in FIGS. 6 and 7). As discussed above, water softener 104 is configured to soften the water prior to relaying the water to electrolytic module 86 (shown in FIGS. 4 and 5). In the shown embodiment, water softener 104 is a dual-chamber water softener that includes chambers 104a and 104b supplied by cover chamber 105. Chambers 104a and 104b may be used to soften the received water in an alternating manner. For example, as discussed below, when chamber 104a may operate to soften the received water while chamber 104b undergoes a regeneration cycle to regenerate its core resin.

Furthermore, a portion of the water may also be controllably added from water softener 104 to brine tank 102 to form the brine solution, and the brine solution may be used to regenerate the core resin in water softener 104, as discussed below. The softened water exits water softener 104 and flows through water line 118 and enters electrolytic module 86 at port 116c, as indicated in FIG. 9. The water entering generator 40 is desirably under pressure (e.g., from a water faucet) to drive the water through water line 92, water softener 104, and water line 118 to electrolytic module 86. Purged brine solutions from water softener 104 (due to regeneration cycles in water softener 104, as discussed below) may flow through regeneration line 119 to a drain or other collection container.

The brine solution in brine tank 102 is drawn into electrolytic module 86 at port 116d. In particular, the brine solution may be drawn through strainer 120 into brine line 122 with the use of an injection pump (not shown in FIG. 9) located in electrolytic module 86. As shown, brine line 122 also extends through a hole in housing 42, allowing the brine solution located in brine tank 102 (located at the front side of housing 42) to reach electrolytic module 86 (located at the rear side of housing 42).

The alkaline solution generated in electrolytic module 86 exits electrolytic module 86 from port 116a and flows through a first of catholyte lines 94 (referred to as catholyte line 94a). From catholyte line 94a, the alkaline solution flows into inlet port 124 of holding tank 106. This allows a portion of the alkaline solution to be dispensed from small vessel fill assembly 46, where small vessel fill assembly 46 is operably connected to bottom port 126 in holding tank 106 with coupling 128 and conduit 129.

As further shown, holding tank 106 includes bypass port 130, which, in the shown example, is sealed with plug 132. In the alternative embodiment in which port 116b of electrolytic module 86 is used as a bypass line to split a stream of the softened water, the split water stream may flow into holding tank 106 through bypass port 130 to dilute the alkaline solution in holding tank 106, as discussed below.

Excess amounts of the alkaline solution may overflow from holding tank 106 through outlet port 134, and flow through a second of catholyte lines (referred to as catholyte line 94b), which extends into interior reservoir 60 of housing 42 through housing port 136. Housing port 136 is located at the top end of housing 42, but at a lower elevation relative to holding tank 106. As such, the overflowing portions of the alkaline solution may flow under gravity into interior reservoir 60 to fill interior reservoir 60. This arrangement allows interior reservoir 60 to be filled with the alkaline solution for dispensing from dispenser assembly 50, while also allowing the alkaline solution to be dispensed from small vessel fill assembly 46.

Generator 40 also includes control system 137, which includes one or more computer-based systems configured to operate the components of generator 40. Control system 137 may be retained at one or more locations of generator 40, such as behind display cover 44 (shown in FIGS. 2 and 3) and/or in electrolytic module 86 (shown in FIGS. 4, 5, and 8), and may be connected to the components of generator 40 with one or more communication and/or electrical power cables. For example, electrolytic module 86 may contain a first portion of control system 137 (e.g., one or more control boards in electrolytic module 86), and generator 40 may contain a second portion of control system 137 (e.g., one or more control board operably supported by housing 42 and/or display cover 44). In the shown embodiment, control system 137 includes current sensor 137s, which is configured to measure the electrical current induced across the electrolysis cell of electrolytic module 86.

Housing 42 also includes fluid level switch 138 at a lower elevation of interior reservoir 60, and fluid level switch 140 at an upper elevation of interior reservoir 60, each of which are sensors (e.g., float switches) connected to the control board(s) of generator 40. Fluid level switch 138 allows control system 137 to detect when the fluid levels in interior reservoir 60 reach a minimum suitable level for operating dispenser assembly 50. If the levels of the alkaline solution in interior reservoir 60 are below the elevation of fluid level switch 138, then control system 137 may prevent operation of pump 68, thereby preventing the alkaline solution from being dispensed from interior reservoir 60 until interior reservoir 60 is refilled to at least the elevation of fluid level switch 138. This prevents damage to pump 68, which may otherwise occur if pump 68 is starved of the alkaline solution.

Fluid level switch 140 allows control system 137 to detect when the fluid levels in interior reservoir 60 reach a maximum suitable level to prevent overflowing interior reservoir 60. As such, fluid level switch 140 is a suitable mechanism for identifying when interior reservoir 60 is full. If the levels of the alkaline solution in interior reservoir 60 reach the elevation of fluid level switch 140, then control system 137 may stop generator 40 from generating additional amounts of the alkaline solution until the levels in interior reservoir 60 fall below the elevation of fluid level switch 140.

Additionally, housing 42 includes overflow port 142 at a location above fluid level switch 140. Overflow port 142 is a backup port that directs excess amounts of the alkaline solution through overflow line 144 to a drain or other collection unit in the event that fluid level switch 140 does not operate correctly (e.g., a switch failure). As shown, housing 42 also includes ports 146 sealed with plugs 148, where ports 146 are located at alternative elevations for placing fluid level switch 140 and overflow line 144.

Housing 42 also includes outlet port 150 at the bottom of generator 40, which is a port at which coupling conduit 90 may be connected to housing 42 for pumping the alkaline solution to dispensing assembly 50. In the shown embodiment, dispenser assembly 50 also includes swivel adapter 152, which interconnects hose 52 and dispensing nozzle 74.

The acidic anolyte solution generated in electrolytic module 86 exits electrolytic module 86 from port 116e and flows through a first of anolyte lines 96 (referred to as anolyte line 96a). From anolyte line 96a, the acidic anolyte solution flows into inlet port 154 of holding tank 108. As discussed above, holding tank 108 is configured to retain a portion of the received acidic anolyte solution for the purpose of balancing pressures within the electrolysis cell of electrolytic module 86.

Excess amounts of the acidic anolyte solution overflow from holding tank 108 through outlet port 156, and flow through a second of anolyte lines 96 (referred to as anolyte line 96b) to a drain or other container for subsequent use, or for being discarded in an environmentally-friendly manner. Holding tank 108 also includes ports 157 and 158, which are respectively sealed with plugs 160 and 162. As such ports 157 and 158 are not used during operation. This arrangement allows holding tanks 106 and 108 to be manufactured from the same molding or casting process, thereby reducing manufacturing costs.

Figure 10:
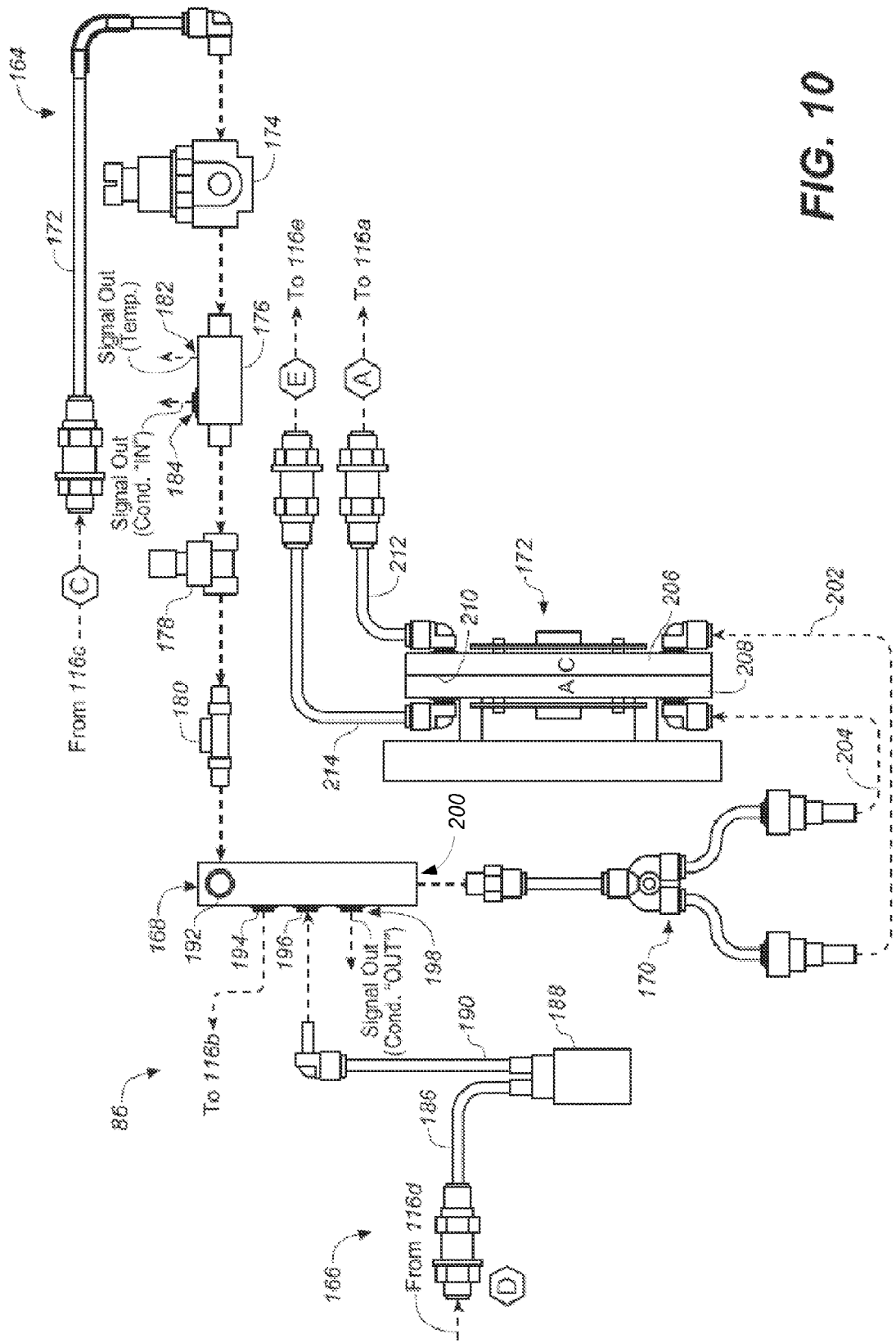
FIG. 10 is a schematic diagram of the electrolytic module.

FIG. 10 illustrates the liquid flow lines through electrolytic module 86, within front housing member 115a and rear housing member 115a (shown in FIG. 8). As shown, electrolytic module 86 also includes water line 164, brine injection line 166, manifold 168, splitter 170, and electrolysis cell 172.

Water line 164 includes conduit 172, pressure-reducing valve 174, sensor coupling 176, valve 178, and flow switch 180. Conduit 172 is coupled to port 116c and directs the received softened water from water line 118 (shown in FIG. 9) to pressure-reducing valve 174. Pressure-reducing valve 174 is configured to adjust the flow of the received softened water to maintain a suitable pressure within electrolysis cell 172.

Sensor coupling 176 interconnects pressure-reducing valve 174 and valve 178, and includes temperature sensor 182 and conductivity probe 184. Temperature sensor 182 is configured to monitor the temperature of the softened water flowing through sensor water line 164. If temperature sensor 182 detects that the temperature of the softened water is above an upper temperature limit, control system 137 may direct valve 178 to block further flow of the softened water to protect electrolysis cell 172 from the elevated temperature.

Conductivity probe 184 is a first probe configured to measure the conductivity of the softened water flowing through water line 164. Valve 178 is a valve assembly (e.g., a solenoid valve) that may be operated by control system 137 with an automated shut-off control loop to prevent water from flowing through electrolysis unit 86. Flow switch 180 is a flow rate sensor that monitors the flow rate of the softened water through water line 164. Flow switch 180 may also be integrated into the automated shut-off control loop. In this manner, if flow switch 180 detects that the flow rate through water line 164 is too low, control system 137 may direct valve 178 to close off water line 164 to protect electrolysis cell 172.

Brine injection line 166 includes inlet line 186, injection pump 188, and injection line 190. Inlet line 186 is a fluid conduit coupled to port 116*d*, and is configured to receive the brine solution from brine line 122 (shown in FIG. 9). Injection pump 188 is a pump (e.g., a positive displacement pump) configured to inject controlled amounts of the brine solution to manifold 168, via injection line 190, based on commands from control system 137.

Manifold 168 is a chamber configured to combine and/or split streams received from water line 164 and brine injection line 166. Manifold 168 includes water inlet port 192, bypass outlet port 194, brine injection port 196, conductivity probe 198, and outlet port 200. Water inlet port 192 is coupled to flow switch 180 for receiving the softened water from water line 164. Bypass outlet port 194 is an outlet port for directing a portion of the received softened water out of electrolytic module 86 at port 116*b*. However, as discussed above, in the shown embodiment, port 116*b* is capped, thereby blocking any portion of the softened water from bypassing electrolytic cell 172. As such, all of the softened water flows through manifold 168 to splitter 170.

Prior to exiting manifold 168, the softened water receives and mixes with the injected brine solution from brine injection line 166 to produce a mixed stream. In particular, injection line 190 is coupled to brine injection port 196, where the injected brine solution mixes with the softened water. Conductivity probe 198 is a second probe configured to measure the conductivity of the resulting mixed stream.

The mixed stream of the softened water and the brine solution exits manifold 168 at outlet port 200, and enters splitter 170. Splitter 170 includes split lines 202 and 204 for separating the mixed stream into separate streams. The relative amounts of the mixed stream that enter split lines 202 and 204 may be controllably varied (e.g., by flow resistance) to select the relative flow rates that enter electrolysis cell 172. Suitable ratios of the flows through split lines 202 to 204 range from about 50:50 to about 75:25.

Split streams 202 and 204 enter electrolysis cell 172 to generate the alkaline solution (from the mixed stream in split line 202) and the acidic anolyte solution (from the mixed stream in split line 204). Electrolysis cell 172 is a two-chamber electrolysis cell, for example, that includes cathode chamber 206 and anode chamber 208, which are separated by a diaphragm or membrane 210. Cathode chamber 206 includes one or more cathode electrodes (not shown) connected to a power source of electrolytic module 86, and cathode chamber 208 includes one or more anode electrodes (not shown) connected to the power source of electrolytic module 86. Examples of suitable electrolysis cells for electrolysis cell 172 include those disclosed in Field et al. U.S. Patent Application Publication No. 2010/0147700. In alternative embodiments, electrolytic module 86 may include multiple electrolysis cells 172 arranged in parallel and/or series arrangements.

As the split streams flow through cathode chamber 206 and anode chamber 208, control system 137 may apply a controlled voltage (e.g., with a pulse-width modulation) to the cathode electrode and anode electrode, inducing an electrical current across electrolysis cell 172. This electrochemically generates the alkaline solution containing an alkaline water with sodium hydroxide from the mixed stream flowing through cathode chamber 206, and electrochemically generates the acidic anolyte solution containing chlorine acidic water from the mixed stream flowing through anode chamber 208.

As the controlled voltage is applied to electrolysis cell 172, current sensor 137*s* of control board 137 may continuously measure or otherwise sense the intensity of the electrical current induced across electrolysis cell 172. Control system 137 may then compare the measured electrical current to a predetermined set point. For an average applied voltage of about 15 volts, suitable conductivity set points range from about 25 amperes to about 35 amperes, for example.

If the measured electrical current is greater than the predetermined set point, this indicates that the concentration of salt in the mixed stream is higher than a target concentration, resulting in a more conductive liquid, and thus, a greater electrical current flow. As such, control system 137 may direct injection pump 188 to reduce the rate at which the brine solution is injected to manifold 168 until the predetermined set point is reached.

Alternatively, if the measured electrical current is less than the predetermined set point, this indicates that the concentration of salt in the mixed stream is lower than the target concentration, and thus, a more resistive liquid. As such, control system 137 may direct injection pump 188 to increase the rate at which the brine solution is injected to manifold 168 until the predetermined set point is reached.

Control system 137 may perform the measurement and adjustment process with a process control loop to provide real-time corrections to the salt concentration in the mixed stream. Thus, the resulting mixed stream that flows through electrolysis cell 172 has a steady salt concentration to consistently generate a high-quality alkaline solution. In addition, as discussed below, control system 137 may also monitor the pump rates of injection pump 188 for identifying when the salt levels in brine tank 102 fall below suitable levels.

In an alternative embodiment, control system 137 may use the measured conductivities from one or both conductivity probes 184 and 198, as an alternative to or in combination with the measured electrical current applied across electrolysis cell 172, to adjust the pump rate of injection pump 188. In this embodiment, if the measured conductivity falls below a predetermined conductivity set point, control system 137 may direct injection pump 188 to increase the rate at which the brine solution is injected to manifold 168 until the predetermined conductivity set point is reached. Alternatively, if the measured conductivity exceeds the predetermined conductivity set point, control system 137 may direct injection pump 188 to decrease the rate at which the brine solution is injected to manifold 168 until the predetermined conductivity set point is reached. Control system 137 may perform the measurement and adjustment process with conductivity probes 184 and 198 using a process control loop to provide real-time corrections to the salt concentration in the mixed stream.

The alkaline solution exits cathode chamber 206 through output line 212, which is coupled to port 116a of electrolytic module 86. From port 116a, the alkaline solution may then flow to holding tank 106, as discussed above. The rate for generating the alkaline solution is desirably less than or equal to the maximum dispensing rate from small vessel fill assembly 46. This reduces the risk of emptying holding tank 106 and starving small vessel fill assembly 46. Accordingly, suitable rates for generating the alkaline solution range from about 1 liter/minute to about 3 liters/minute, for example.

Correspondingly, the acidic anolyte solution exits anode chamber 108 through output line 214, which is coupled to port 116e of electrolytic module 86. From port 116e, the acidic anolyte solution may then flow to holding tank 108, as discussed above.

Electrolysis cell 172 is suitable for consistently generating a high-quality alkaline solution. The resulting alkaline solution that exits cathode chamber 206 has a concentration of sodium hydroxide that may vary based on the controlled salt concentration in the mixed stream entering electrolysis cell 172, the voltage applied to electrolysis cell 172, and other similar operating conditions. Suitable concentrations of sodium hydroxide in the alkaline solution exiting electrolysis cell 172 range from about 0.0001% by weight to about 0.003% by weight, with particularly suitable concentrations ranging from about 0.0005% by weight to about 0.002% by weight, for example.

In the above-discussed embodiment, port 116b is capped, thereby blocking any portion of the softened water from bypassing electrolytic cell 172. As such, when filled, holding tank 106 and interior reservoir 60 retain the alkaline solution having the same or substantially the same concentration of sodium hydroxide as the alkaline solution exiting electrolysis cell 172 through output line 212.

However, in the alternative embodiment in which port 116b of electrolytic module 86 is used as a bypass line, the softened water from water line 164 may be split such that a first portion (e.g., 50% by volume) of the softened water flows through manifold 168 to splitter 170 as discussed above. This portion of the softened water is mixed with the injected brine solution and undergoes the reaction within electrolysis cell 172 to generate the alkaline solution. This alkaline solution is then directed from electrolysis cell 172 to holding tank 106.

The second portion of the softened water bypasses electrolysis cell 172 and exits electrolytic module 86 through bypass outlet port 194 and port 116b. From port 116b, the bypassed softened water may then flow through a fluid conduit (not shown) into bypass port 130 of holding tank 106 (shown in FIG. 9). As such, plug 132 (shown in FIG. 9) may be omitted in this embodiment. This arrangement allows the bypassed softened water to dilute the alkaline solution in holding tank 106 by a desired amount. This diluted alkaline solution may also pour into interior reservoir 60 in the same manner as discussed above to provide the diluted solution for dispensing from dispenser assembly 50. Accordingly, a user of generator 40 may adjust the dilution rates of the alkaline solution to desired levels for use in a variety of different cleaning applications.

Figure 11:
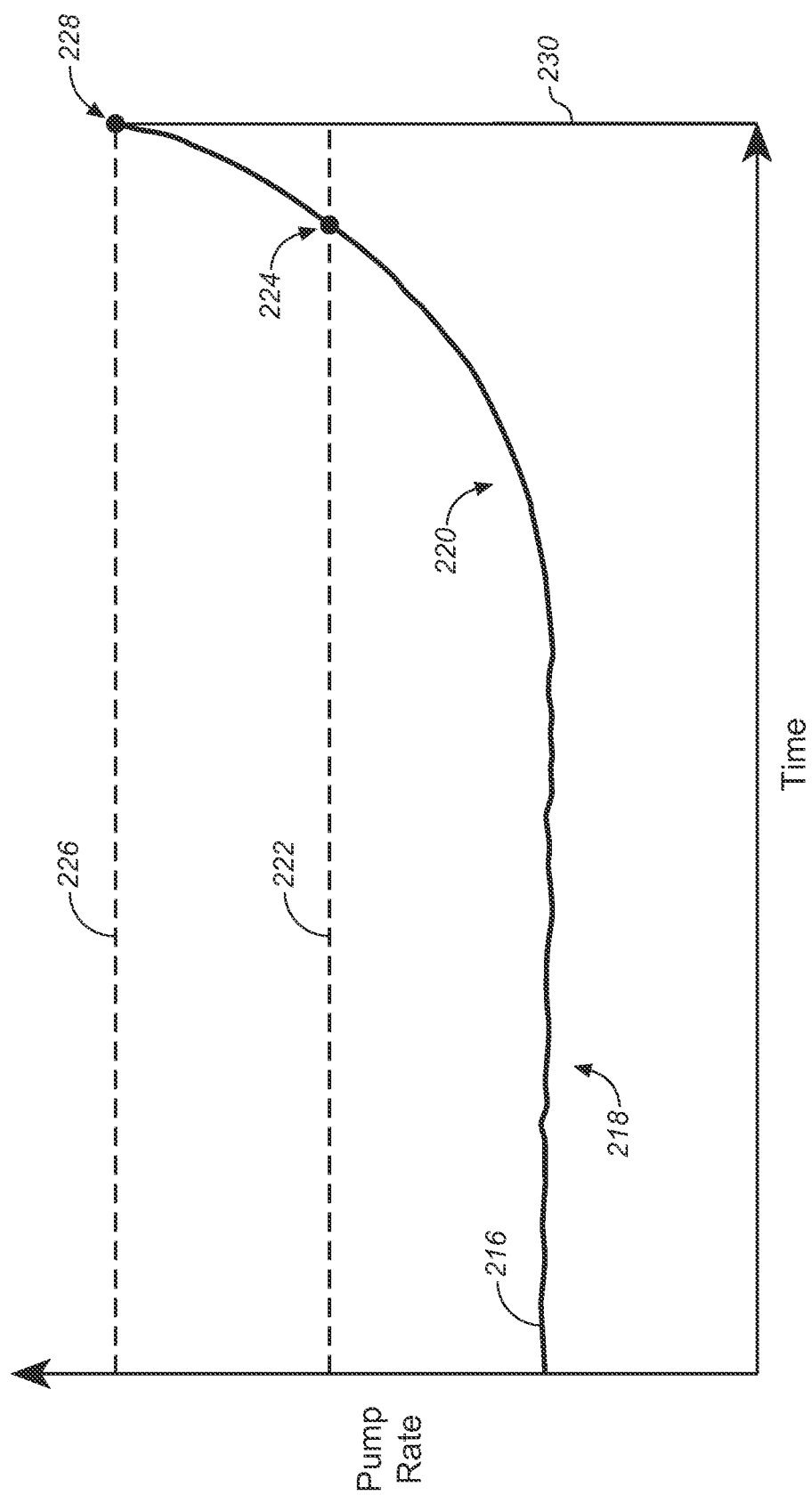
FIG. 11 is a graphical illustration of a plot of pump rates of a brine solution injection pump over time, illustrating a process for determining salt levels in a brine tank of the cleaning solution generator with the use of the pump rates of the brine solution injection pump.

FIG. 11 is a graphical illustration of plot 216, which is a plot of pump rates versus time for injection pump 188 in electrolytic module 86 (shown in FIG. 10 in an exemplary embodiment). During standard operation with a saturated brine solution being injected to manifold 168, control system 137 may make small adjustments to the pump rates of injection pump 188 to maintain the predetermined set point, based on the measured electrical currents induced across electrolysis cell 172 (e.g., with current sensor 137a). This is illustrated over segment 218 of plot 216, where the step rates of plot 216 show only minor fluctuations.

While the brine solution from brine tank 102 (shown in FIGS. 6 and 7) remains saturated with salt, the pump rates of injection pump 188 may follow the regular pattern of plot 216 at segment 218. However, over extended periods of operation, the supply of salt added to brine tank 102 may eventually be depleted. As the amount of salt in brine tank 102 drops below a given level, the salt concentration in the brine solution injected from brine injection line 166 also experiences a decrease in salt concentration.

As this decrease in salt concentration occurs, the measured electrical current induced across electrolysis cell 172 will also begin to decrease from the predetermined set point. As discussed above, to compensate for this decrease in measured electrical current, control system 137 may increase the pump rate of injection pump 188 to inject greater amounts of the brine solution to manifold 168. This is illustrated by an increase in slope of plot 216 at segment 220, and compensates for the decreased salinity in the brine solution to extend the useful life of the salt supply in brine tank 102.

As the supply of salt in brine tank 102 is further depleted over time, control system 137 may continue to increase the pump rate of injection pump 188 until warning threshold 222 is reached, as indicated by point 224 of plot 216. At warning threshold control system 137 may trigger a warning indication that the salt levels in brine tank 102 are low. For example, display panel 62 (shown in FIGS. 2 and 3) may display a warning indicator for the user to replenish the supply of salt in brine tank 102.

At this point, generator 40 may continue to generate the alkaline solution as the pump rate of injection pump 188 is still below its maximum operable rate. If the user still does not replenish the supply of salt in brine tank 102, the supply of salt in brine tank 102 may become further depleted over time. Control system 137 accordingly may continue to increase the pump rate of injection pump 188 until shut-off threshold 226 is reached, as indicated by point 228 of plot 216. At shut-off threshold 226, control system 137 may shut electrolytic module 86 down to protect injection pump 188, electrolysis cell 172, and to ensure that the quality of the alkaline solution does not decrease. This is indicated by the abrupt drop in the pump rate from the level of shut-off threshold 226 to a pump rate of zero, as indicated by segment 230 of plot 216.

At this point, control system 137 may also trigger an additional warning indicator that the salt levels in brine tank 102 are below the operable limit. When the user subsequently replenishes the supply of sale in brine tank 102, generator 40 may be reset and the new brine solution injected to manifold 168 may provide acceptable conductivity levels to restart the electrolysis process. Accordingly, injection line 166 and manifold 168 provide a dual-purpose function of ensuring that the mixed stream flowing into electrolysis cell 172 has a controlled salt concentration, as well as providing a low-salt warning and shut-off safety system. This further ensures that electrolysis cell 172 consistently generates a high-quality, alkaline solution, while also protecting the components of generator 40.

Figure 12:
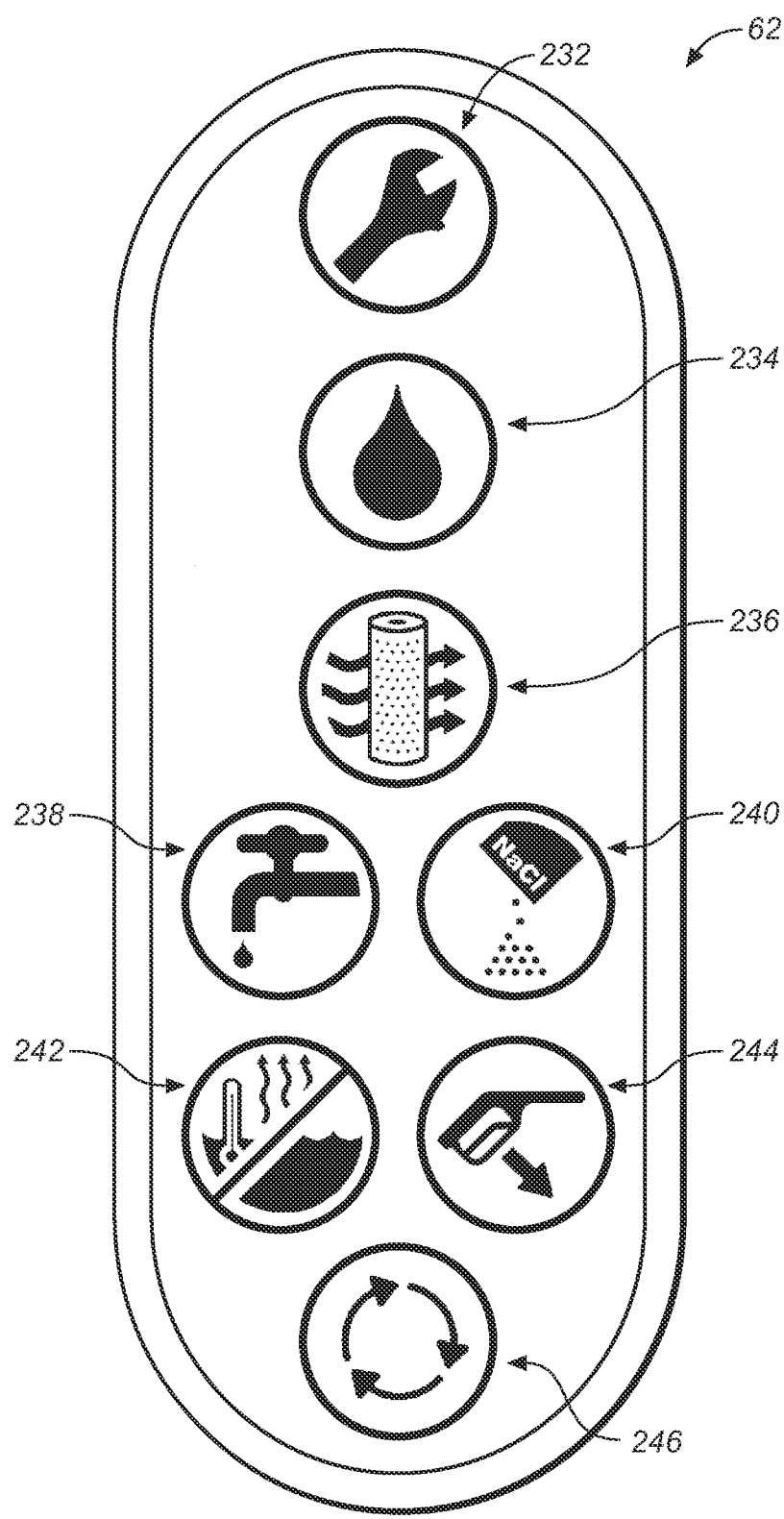
FIG. 12 is a front view of a display panel of the cleaning solution generator.

As shown in FIG. 12, display panel 62 is a computer-based display (e.g., a liquid crystal display (LCD)) for providing a variety of different visual and/or audible indicators to assist users in operating generator 40. For example, in the shown embodiment, display panel 62 includes service indicator 232, generating indicator 234, filter change indicator 236, water flow indicator 238, low salt indicator 240, water temperature indicator 242, nozzle dock indicator 244, and reset button 246.

Display panel 62 may illuminate service indicator 232 when control system 137 detects that one or more components of generator 40 require maintenance. Display panel 62 may illuminate generating indicator 234 to indicate the state of operation of generator 40 in generating the alkaline solution and filling interior reservoir 60. For example, while generator 40 is generating the alkaline solution and filling interior reservoir 60, generating indicator 234 may flash on and off to inform the user of this operation. When fluid level switch 140 identifies that interior reservoir 60 is full, control system 137 may stop further generation of the alkaline solution, and fully illuminate generating indicator 234 in a non-flashing manner. This may then inform the user that generator 40 is full and ready for dispensing at its maximum capacity.

Change filter indicator 236 may be illuminated after a given amount of time of operating generator 40 to inform the user that a filter cartridge in input filter 69 needs to be replaced. Water flow indicator 238 may be illuminated when flow switch 180 in electrolytic module 86 detects that the flow rate through water line 164 is too low or there is no flow. As discussed above, flow switch 180 may also be integrated into the automated shut-off control loop to direct valve 178 to close off water line 164 to protect electrolysis cell 172.

Low salt indicator 240 may be illuminated when the salt supply in brine tank 102 is low or empty. As discussed above, control system 137 may monitor the salt levels in brine tank 102 based on the pump rate of injection pump 188 and conductivity probe 198. Accordingly, display panel 62 may flash low salt indicator 240 when the pump rate of injection pump 188 exceeds warning threshold 222, but remains below shut-off threshold 226. This informs the user that additional salt needs to be added to brine tank 102, but also allows generator 40 to continue operating until shut-off threshold 226 is reached.

When the pump rate of injection pump 188 exceeds shut-off threshold 226, display panel 62 may illuminate low salt indicator 240 in a non-flashing manner to inform the user that generator 40 will not continue to operate until salt is added to brine tank 102. As discussed above, control system 137 may also shut electrolytic module 86 down to protect injection pump 188, electrolysis cell 172, and to ensure that the quality of the alkaline solution does not decrease.

When the user subsequently replenishes the supply of sale in brine tank 102, the user may press reset button 246. Control system 137 may then undergo a reset and initialization run to check the salinity levels of the mixed stream to verify whether the user did indeed resupply brine tank 102 with additional salt. This salinity check may be performed by monitoring the pump rate of injection pump 188 and the electrical current induced through electrolysis cell 172.

Water temperature indicator 242 may be illuminated when temperature sensor 182 in electrolytic module 86 detects that the temperature of the softened water flowing through water line 164 is greater than the threshold temperature. For example, this may occur if a user opens a hot water line to generator 40. When temperature sensor 182 detects that the softened water flowing through water line 164 is greater than the threshold temperature, control system 137 may direct valve 178 to block further flow of the softened water to protect electrolysis cell 172, and may illuminate water temperature indicator 242. This informs the user to close the hot water line and open a cold water line to generator 40, and then press reset button 246. Generator 40 may then undergo reset and initialization run to recheck the temperature of the new softened water flowing through water line 164 with temperature sensor 182.

Nozzle dock indicator 244 may be illuminated when dispensing nozzle 74 is removed from nozzle dock 66. As discussed above, nozzle dock 66 may include a sensor (e.g., magnetic and/or contact switches) configured to detect the presence of dispensing nozzle 74 when dispensing nozzle 74 is inserted and retained in nozzle dock 66. When the sensor in nozzle dock 66 detects that the user has removed dispensing nozzle 74 from nozzle dock 66, display panel 62 may illuminate nozzle dock indicator 244 to remind the user to return dispensing nozzle 74 back to nozzle dock 66 when the user has completed the dispensing operation.

Reset button 246 may include a visible illuminated icon, as shown, and may also function as an actuatable button (e.g., a touch pad or touch screen). Display panel 62 may illuminate reset button 246 whenever control system 137 requires generator 40 to be reset, such as when one or more of service indicator 232, generating indicator 234, filter change indicator 236, water flow indicator 238, low salt indicator 240, water temperature indicator 242, and nozzle dock indicator 244 are illuminated. The user may then press reset button 246 to have generator 40 undergo reset and initialization run for subsequent operation.

While illustrated with the above-discussed indicators, display panel 62 may alternatively include different visible and/or audible indicators for providing users with information relating to generator 40. However, display panel 62 as shown provides a convenient user interface that simplifies the operation of generator 40 with intuitive controls and indicators. In additional embodiments, display panel 62 (and/or any other component of generator 40) may also include one or more wireless communication mechanisms (e.g., Wi-Fi network devices, Bluetooth wireless devices, and cellular devices). For example, display panel 62 may also include a wireless communication mechanism to transmit warning information to a user's mobile device, where the wireless communication mechanism may also receive transmitted information from users (e.g., reset activations and firmware updates). This further increases the versatility of display panel 62.

Figure 13:
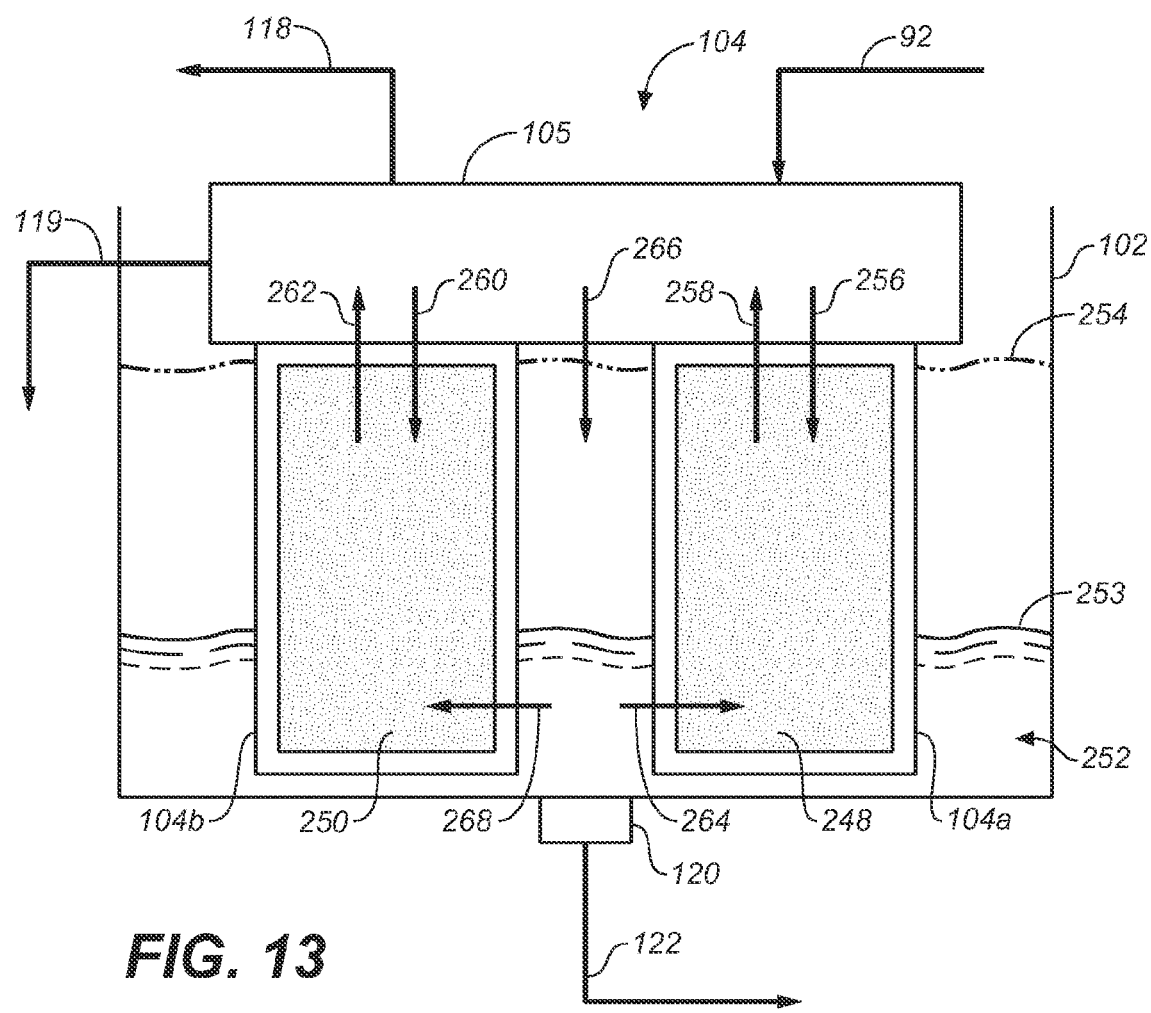
FIG. 13 is a schematic illustration of a combined brine tank and water softener of the cleaning solution generator.

FIG. 13 illustrates an example arrangement for brine tank 102 and water softener 104, illustrating how brine tank 102 and water softener 104 may effectively function as a combined water softener/brine injection system. Chambers 104*a* and 104*b* of water softener 104 respectively include core resins 248 and 250, each of which may include media of an ion exchange resin (e.g., zeolite pellets).

Additionally, brine tank 102 may include brine solution 252 up to fill level 253, and salt media (e.g., salt pellets) up to fill level 254, for example. As discussed below, brine solution 252 may be attained by introducing a portion of the water from water softener 104 into brine tank 102. Fill level 253 of brine solution 252 is desirably lower than fill level 254 of the salt to reduce the rate at which the salt is dissolved into brine solution 252, where fill level 253 may be regulated with a sensor (e.g., a flow sensor).

As discussed above, water may enter water softener 104 from water line 92. In the shown embodiment, the water may enter cap chamber 105 and be directed to either chamber 104*a* or chamber 104*b*, depending on which chamber is currently active. For example, when chamber 104*a* is active for functioning as a regenerated water softener, cap chamber 105 may close off access to chamber 104*b* and direct the water into chamber 104*a*, as illustrated by arrow 256. Core resin 248 may then react with the received water through an ion exchange reaction to replace calcium ions in the water with sodium ions, thereby softening the received water. The resulting softened water may then exit chamber 104a into cap chamber 105 (as illustrated by arrow 258), and then out of water softener 104 through water line 118, as discussed above. The softened water may then be mixed with brine solution 252 in electrolytic module 86, where brine solution 252 may be drawn through strainer 120 and brine line 122 for injection, as also discussed above.

After a given duration, cap chamber 105 may switch access from chamber 104a to chamber 104b, such as when core resin 248 in chamber 104a requires regeneration to replace the collected calcium ions and new sodium ions. At this point, cap chamber 105 (e.g., under the control of control system 137 or other controller) may divert the received water from water line 92 to chamber 104b, as illustrated by arrow 260. Core resin 250 may then perform an ion exchange reaction to replace calcium in the received water with sodium ions, thereby softening the received water in the same manner as core resin 248. The resulting softened water may then exit chamber 104b into cap chamber 105 (as illustrated by arrow 262), and then out of water softener 104 through water line 118, as discussed above.

While the received water is diverted to chamber 104b, chamber 104a may undergo a regeneration cycle to replenish core resin 248 with a fresh supply of sodium ions. For example, at least a portion of brine solution 252 may be pumped into chamber 104a, as illustrated by arrow 264 to react with core resin 248. This reaction transfers the sodium ions from brine solution 252 to core resin 248, and removes the calcium ions (any any other collected ions) from core resin 248, to replenish core resin 248. After a suitable time for the regeneration cycle to be completed, the resulting regeneration solution in chamber 104a may be flushed and purged from chamber 104a and drained from water softener 104 through regeneration line 119, as discussed above.

Additionally, a portion of the received water from water line 92 may be introduced into brine tank 102 (as illustrated by arrow 266) to create a new supply of brine solution 252 in brine tank 102. The amount of the water introduced into brine tank 102 may be regulated with a sensor (e.g., a float sensor), as mentioned above.

The softened water from chamber 104b may mixed with the new supply of brine solution 252 in electrolytic module 86, where the new supply of brine solution 252 may be drawn through strainer 120 and brine line 122 for injection, as discussed above. After a given duration, cap chamber 105 may switch access from chamber 104b back to chamber 104b, such as when core resin 250 in chamber 104b requires regeneration to replace the collected calcium ions and new sodium ions. At this point, cap chamber 105 (e.g., under the control of control system 137 or other controller) may divert the received water from water line 92 to chamber 104a, as illustrated by arrow 256. Core resin 250 may then perform an ion exchange reaction to replace calcium in the received water with sodium ions in the same manner as discussed above.

While the received water is diverted to chamber 104a, chamber 104b may undergo a regeneration cycle to replenish core resin 250 with a fresh supply of sodium ions. For example, at least a portion of the new supply of brine solution 252 may be pumped into chamber 104b, as illustrated by arrow 268 to react with core resin 250. This reaction transfers the sodium ions from brine solution 252 to core resin 250, and removes the calcium ions from core resin 250, to replenish core resin 250. After a suitable time for the regeneration cycle to be completed, the resulting regeneration solution in chamber 104b may be flushed and purged from chamber 104b, and drained from water softener 104 through regeneration line 119, as discussed above.

A portion of the received water from water line 92 may also be introduced into brine tank 102 (as illustrated by arrow 266) to create a new supply of brine solution 252 in brine tank 102. The softened water from chamber 104a may then be mixed with the new supply of brine solution 252 in electrolytic module 86, where the new supply of brine solution 252 may be drawn through strainer 120 and brine line 122 for injection, as discussed above.

This process may then be repeated to alternate the water softening operations between chambers 104a and 104b. The use of dual chambers for water softener 104 is suitable for reducing delays in the electrolysis process. In alternative embodiments, generator 40 may include a single chamber for performing the water softening operation, or may include three or more chambers, as desired. Furthermore, water softener 104 is an example of a suitable water softener for use in brine tank 102. In alternative embodiments, generator 40 may incorporate water softeners having alternative designs and flow arrangements, while desirably allowing brine solution 252 to replenish the core resins of the given water softeners.

The injection volumes of brine solution 252 with injection pump 188 desirably do not completely empty brine solution 252 from brine tank 102. This allows a base volume of brine solution 252 to be available for regenerating chambers 104a and 104b when needed. In the event that brine solution 252 is emptied from brine tank 102, additional amounts of the received water may be introduced to brine tank 102 (as illustrated by arrow 266) to replenish the supply of brine solution 252 in brine tank 102.

The arrangement of brine tank 102 and water softener 104 shown in FIG. 13 allows a single system to efficiently soften the received water, as well as create and supply brine solution 252 for injection at electrolysis module 86. Thus, brine solution 252 may function as an injected brine solution for the electrolysis process, as well as a regeneration mechanism for water softener 104. As such, brine tank 102 and water softener 104 effectively function as a combined water softener/brine injection system to increase the efficiency of generator 40.

Although the present disclosure has been described with reference to preferred embodiments, workers skilled in the art will recognize that changes may be made in form and detail without departing from the spirit and scope of the disclosure.

The invention claimed is:
1. A cleaning solution generator comprising:
a housing providing a rigid structure retaining components of the generator;
an interior reservoir integrally fabricated within a hollow portion of the housing;
a brine tank integrally fabricated as a pocket within the housing, wherein the housing, the interior reservoir and the brine tank are integrally formed as a single article;
a brine tank cover, which covers the pocket and is accessible from an exterior of the housing;
a water inlet line configured to receive water;
a water softener retained by the housing and comprising:
resin chamber disposed at least partially within the brine tank, and configured to retain a core resin; and
a first inlet configured to receive the water from the water inlet line;
a first outlet configured to direct a first portion of the received water from the water inlet line to the resin chamber to soften the first portion of the received water with the core resin;

one or more lines configured to receive the softened water from the water softener chamber, and to direct the received softened water out of the water softener; and a second outlet configured to direct a second portion of the received water from the water inlet line to the brine tank to produce a brine solution in the brine tank;

a manifold retained by the housing and configured to receive and mix the softened water from the water softener and the brine solution from the brine tank to produce a mixed solution;

an electrolysis cell retained by the housing and configured to receive the mixed solution and to generate an alkaline solution from at least a portion of the mixed solution; and a fluid conduit assembly configured to operably direct the generated alkaline solution to the interior reservoir of the housing.

2. The cleaning solution generator of claim 1, wherein the fluid conduit assembly comprises:

a holding tank operably supported by the housing, the holding tank comprising an inlet port and an overflow port;

at least one conduit line interconnecting the electrolysis cell to the inlet port of the holding tank; and at least one fluid line interconnecting the overflow port of the holding tank and the interior reservoir.

3. The cleaning solution generator of claim 2, wherein the holding tank further comprises an output port, and wherein the cleaning solution generator further comprises:

a small vessel dispenser assembly comprising a dispenser and at least one liquid line interconnecting the output port of the holding tank and the dispenser;

a large vessel dispenser assembly comprising a further dispenser and at least one liquid line interconnecting the interior reservoir and the further dispenser wherein the large vessel dispenser assembly has a greater output flow rate than the small vessel dispenser assembly.

4. The cleaning solution generator of claim 1, and further comprising:

a liquid pump;

at least one conduit interconnecting the interior reservoir and the liquid pump; and a dispenser assembly operably connected to the liquid pump.

5. The cleaning solution generator of claim 1, and further comprising:

an injection pump configured to inject the brine solution from the brine tank to the manifold;

a current sensor configured to measure a current induced across the electrolysis cell; and a control system configured to adjust a pump rate of the injection pump in response to the measured currents from the current sensor.

6. The cleaning solution generator of claim 5, wherein the control system is further configured to compare the pump rate of the injection pump to at least one pump rate threshold.

7. The cleaning solution generator of claim 6, and further comprising a display panel, wherein the display panel is configured to display an indicator when the pump rate of the injection pump exceeds the at least one pump rate threshold.

8. The cleaning solution generator of claim 1, wherein the cleaning solution generator further comprises a control system configured to direct a portion the brine solution from the brine tank into the water softener to regenerate the core resin.

9. The cleaning solution generator of claim 1, wherein:

the electrolysis cell is further configured to generate an acidic solution from at least a portion of the mixed solution;

the fluid conduit assembly comprises:

a first holding tank operably supported by the housing, the first holding tank comprising an inlet port and an overflow port;

at least one conduit line interconnecting a first, alkaline port of the electrolysis cell to the inlet port of the first holding tank; and at least one fluid line interconnecting the overflow port of the first holding tank and the interior reservoir;

the generator further comprises:

a second holding tank operably supported by the housing, the second holding tank comprising an inlet port and an overflow port; and at least one conduit line interconnecting a second, acidic port of the electrolysis cell to the inlet port of the second holding tank; and the first and second holding tanks are supported by the housing at a same elevation and have a same liquid holding capacity.

10. A cleaning solution generator comprising:

a housing providing a rigid structure retaining components of the generator;

an interior reservoir integrally fabricated within a hollow portion of the housing;

a brine tank integrally fabricated as a pocket within the housing, wherein the housing, the interior reservoir and the brine tank are integrally formed as a single article, and the brine tank is accessible from an exterior of the housing;

a water inlet line configured to receive water;

a water softener retained by the housing and comprising:

a resin chamber disposed at least partially within the brine tank, and configured to retain a core resin; and a first inlet configured to receive the water from the water inlet line;

a first outlet configured to direct a first portion of the received water from the water inlet line to the resin chamber to soften the first portion of the received water with the core resin;

one or more lines configured to receive the softened water from the water softener chamber, and to direct the received softened water out of the water softener; and a second outlet configured to direct a second portion of the received water from the water inlet line to the brine tank to produce a brine solution in the brine tank;

an injection pump retained by the housing and configured to draw the brine solution from the brine tank;

a manifold retained by the housing and configured to receive the softened water from the water softener and the brine solution from the injection pump to produce a mixed solution;

an electrolysis cell retained by the housing and configured to receive the mixed solution and to generate an alkaline solution from at least a portion of the mixed solution;

a fluid assembly configured to operably direct the generated alkaline solution to the interior reservoir of the housing;

a current sensor configured to measure an electrical current induced across the electrolysis cell; and a control system retained by the housing and configured to adjust a pump rate of the injection pump in response to the measured currents from the current sensor, and further configured to direct a portion the brine solution from the brine tank into the water softener to regenerate the core resin.

11. The cleaning solution generator of claim 10, and further comprising a display panel, wherein the display panel is configured to display an indicator when the pump rate of the injection pump exceeds the at least one pump rate threshold.

12. The cleaning solution generator of claim 11, wherein the displayed indicator relates to a low salt level in the brine tank.

13. The cleaning solution generator of claim 11, wherein the control system is further configured to compare the pump rate of the injection pump to at least one pump rate threshold that comprises:
   a first pump rate threshold, wherein the display panel is configured to display the indicator when the pump rate of the injection pump reaches the first pump rate threshold; and
   a second pump rate threshold greater than the first pump rate threshold, wherein control system is configured to stop operation of at least a portion of the cleaning solution generator when the pump rate of the injection pump reaches the second pump rate threshold.

14. The cleaning solution generator of claim 10, wherein the water softener is at least partially disposed within the brine tank.

15. A cleaning solution generator comprising:
   a housing providing a rigid structure retaining components of the generator;
   an interior reservoir integrally fabricated within a hollow portion of the housing;
   a brine tank configured to supply a brine solution and integrally fabricated as a pocket within the housing, wherein the housing, the interior reservoir and the brine tank are integrally formed as a single article;
   a water inlet line configured to receive water;
   a water softener comprising:
      a resin chamber disposed at least partially within the brine tank, and configured to retain a core resin; and
      a first inlet configured to receive the water from the water inlet line;
      a first outlet configured to direct a first portion of the received water from the water inlet line to the resin chamber to soften the first portion of the received water with the core resin;
      one or more lines configured to receive the softened water from the water softener chamber, and to direct the received softened water out of the water softener; and
      a second outlet configured to direct a second portion of the received water from the water inlet line to the brine tank to produce a brine solution in the brine tank;
   a water line configured to receive the softened water from the water softener;
   an injection pump configured to inject a second portion of the brine solution from the brine tank to mix with the softened water from the water line to produce a mixed solution;
   an electrolysis cell configured to receive the mixed solution and to generate an alkaline solution from at least a portion of the mixed solution; and
   a fluid conduit assembly configured to operably direct the generated alkaline solution to the interior reservoir of the housing.

16. The cleaning solution generator of claim 15, wherein the water softener comprises:
   a first chamber configured to receive a first portion of the core resin;
   a second chamber configured to receive a second portion of the core resin; and
   a mechanism configured to selectively direct the received water from the water inlet line to either the first chamber or the second chamber.

17. The cleaning solution generator of claim 15, and further comprising:
   a current sensor configured to measure a current induced across the electrolysis cell; and
   a control system configured to adjust a pump rate of the injection pump in response to the measured currents from the current sensor.

\* \* \* \* \*